United States Patent [19]
Niksa et al.

[11] Patent Number: 5,196,276
[45] Date of Patent: Mar. 23, 1993

[54] RESERVE BATTERY

[75] Inventors: Marilyn J. Niksa, Concord; Kenneth J. Gregg, Mentor; Jay M. Noscal, Jefferson; Roger J. Chmura, Mentor, all of Ohio

[73] Assignee: Eltech Systems Corporation, Boca Raton, Fla.

[21] Appl. No.: 701,899

[22] Filed: May 17, 1991

[51] Int. Cl.$^5$ ............... H01M 6/36; H01M 10/44
[52] U.S. Cl. ............................ 429/52; 429/116; 429/118
[58] Field of Search ............ 429/52, 113, 116, 118, 429/112, 120

[56] References Cited

U.S. PATENT DOCUMENTS

| | | |
|---|---|---|
| 3,437,528 | 4/1969 | Musselman . |
| 3,589,947 | 6/1971 | Maxel et al. .............. 429/112 X |
| 3,865,631 | 2/1975 | Clayman . |
| 3,930,885 | 1/1976 | Dey ........................... 429/116 |
| 4,288,501 | 9/1981 | Moody ........................ 429/70 |
| 4,612,264 | 9/1986 | Fairwood et al. ............ 429/116 X |
| 4,642,275 | 2/1987 | Smith et al. ................. 429/52 |
| 4,695,520 | 9/1987 | Koper et al. ................. 429/116 |
| 4,842,964 | 6/1989 | Tarcy ........................ 429/52 |
| 4,925,744 | 5/1990 | Niksa et al. ................. 429/27 |

FOREIGN PATENT DOCUMENTS 255512 7/1967 Austria ........................ 429/116

OTHER PUBLICATIONS

Masterson et al., *Chemical Principles;* Philadelphia, London and Toronto; WB Saunders Company; 1969; pp. 457-477.

*Primary Examiner*—Stephen Kalafut
*Attorney, Agent, or Firm*—John J. Freer

[57] ABSTRACT

A compact reserve battery is disclosed comprising a cell housing, an expandable cell stack contained within a first portion of the housing, and an electrolyte reservoir contained within a second portion of the housing. The cell stack is expandable into the housing second portion, expansion of the cell stack displacing electrolyte from the electrolyte reservoir into the cell stack, thereby activating the battery.

40 Claims, 13 Drawing Sheets

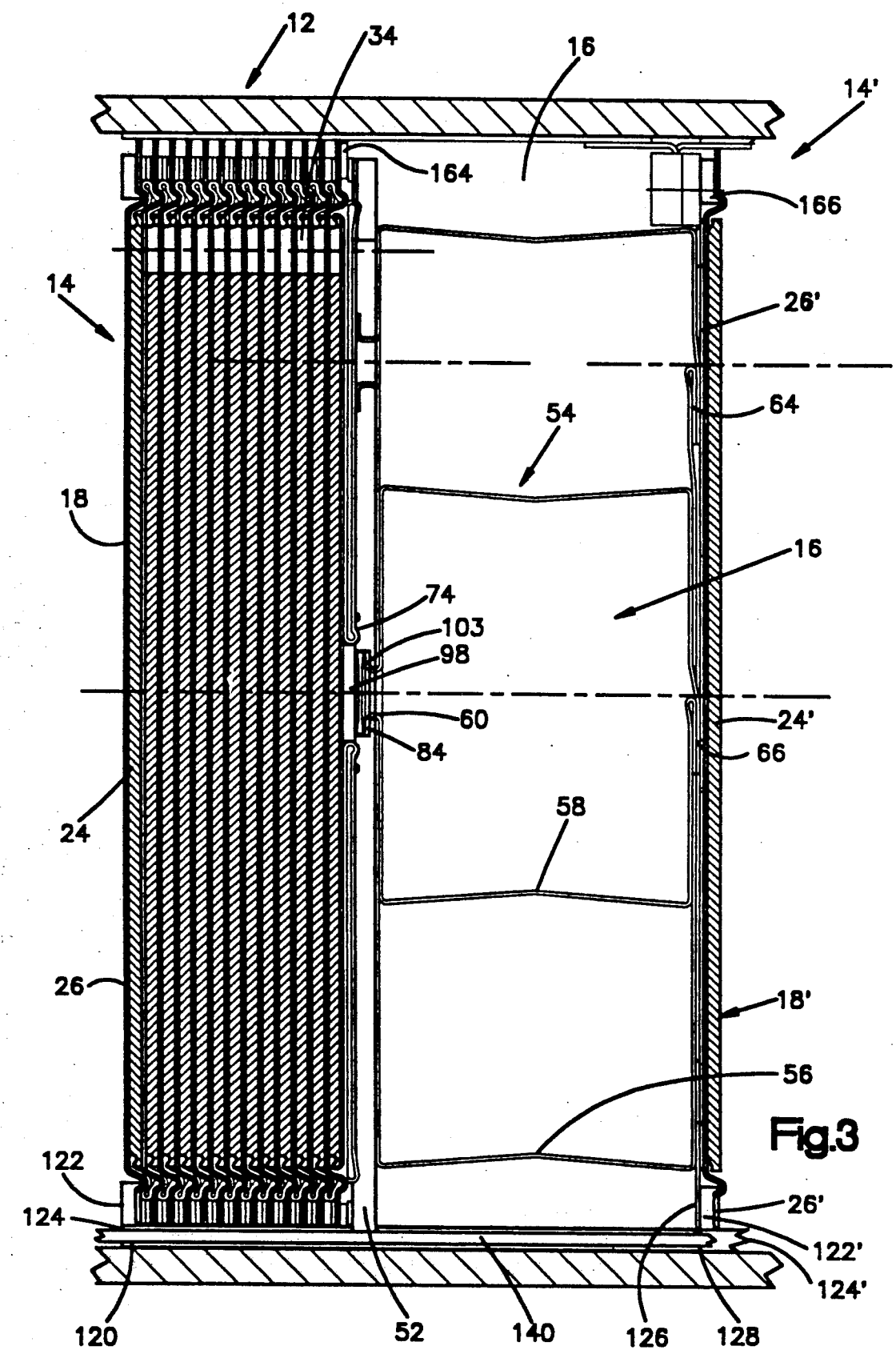

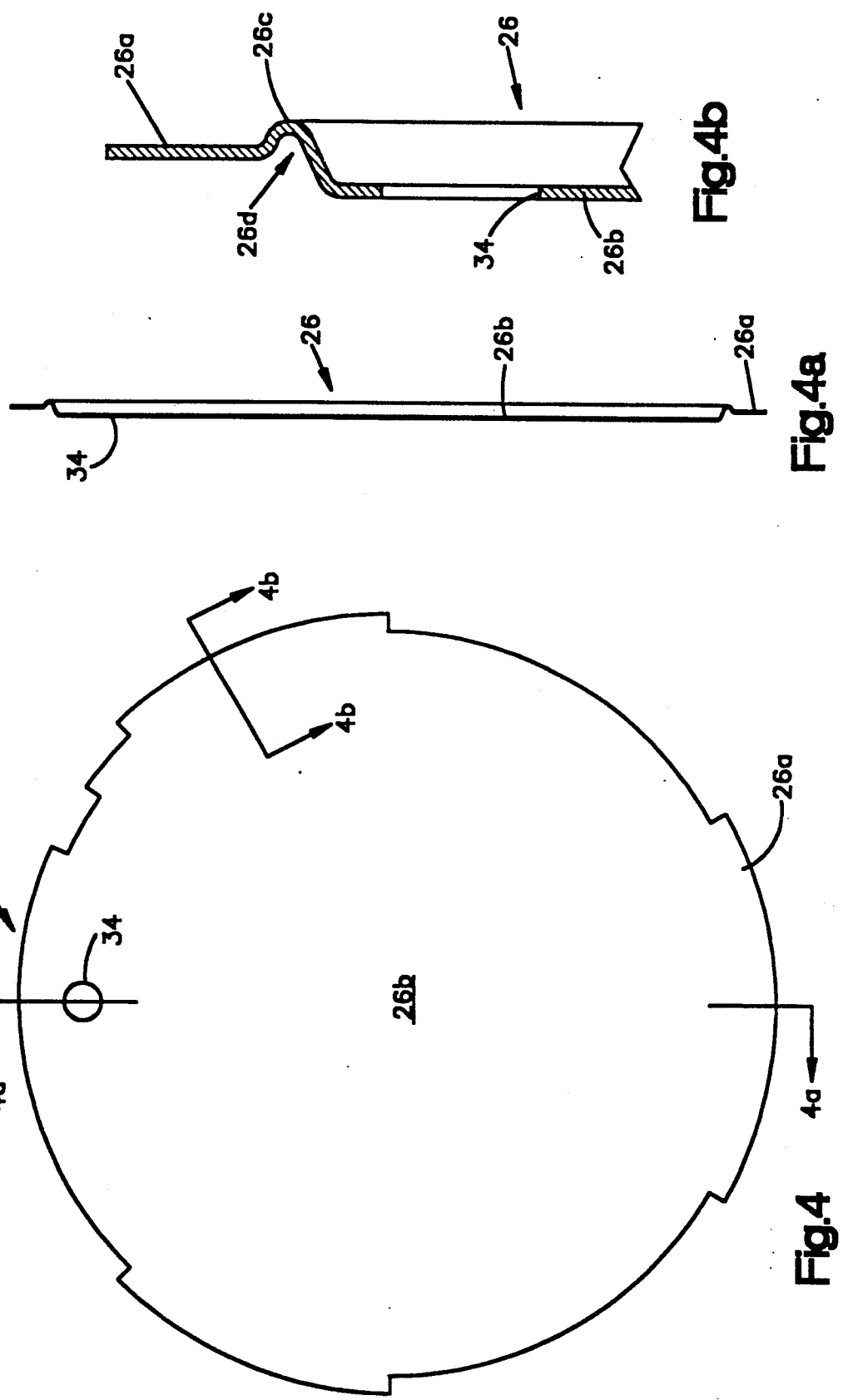

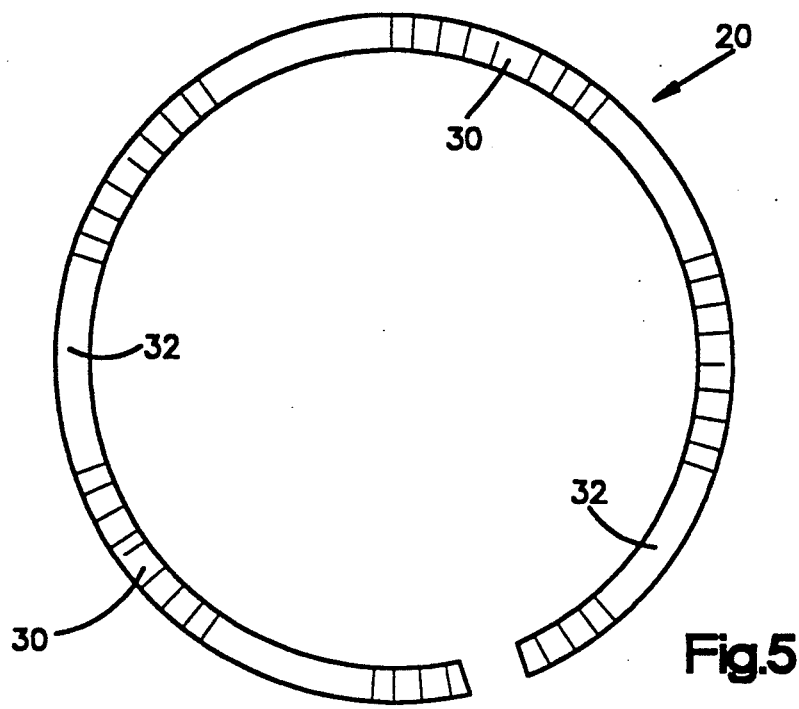
Fig.5
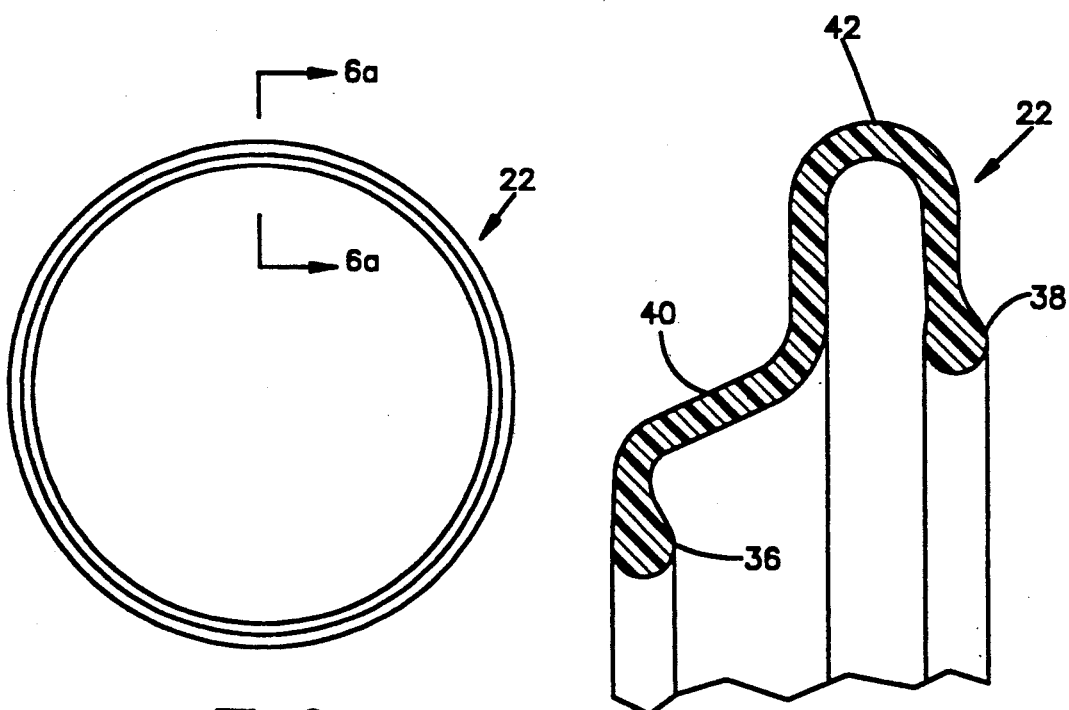
Fig.6
Fig.6a

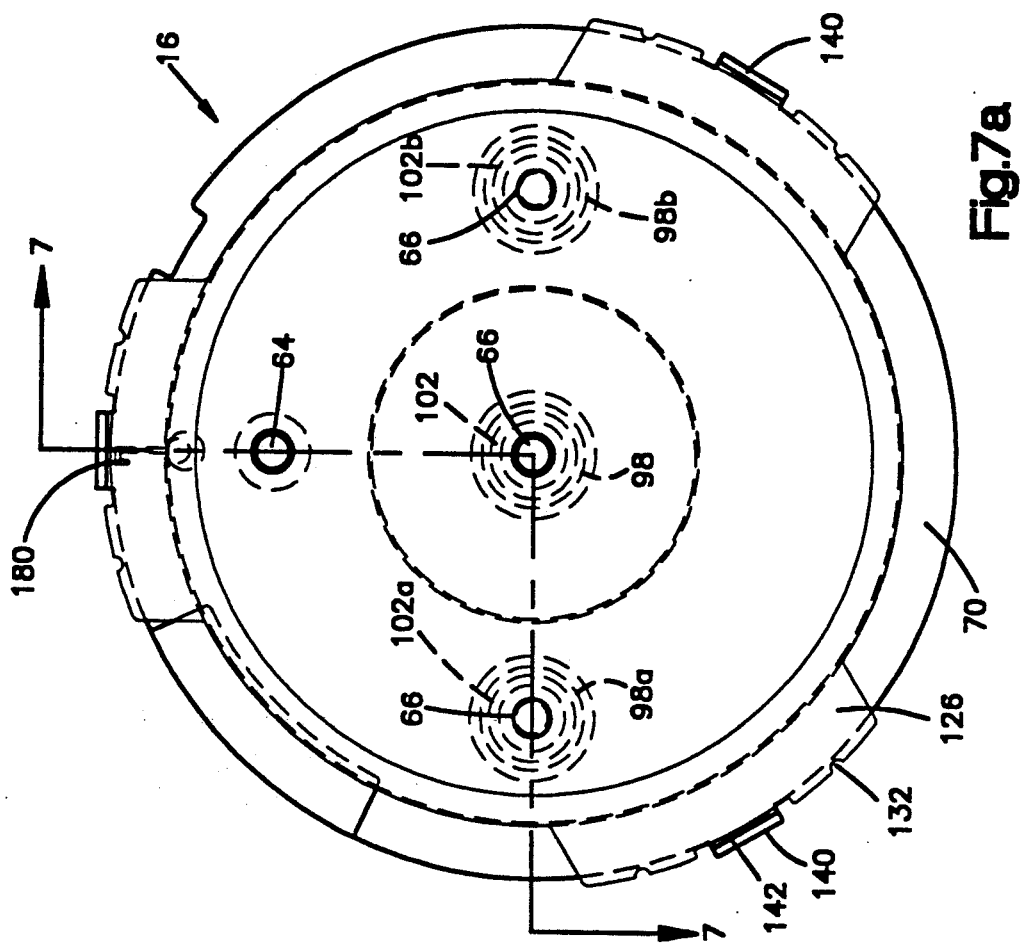
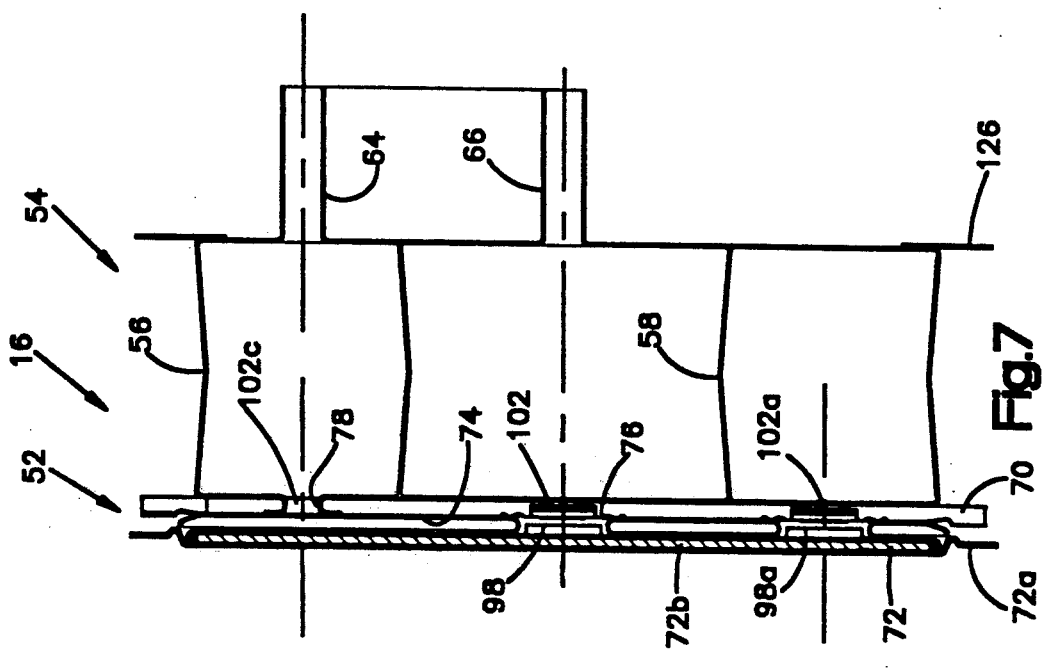

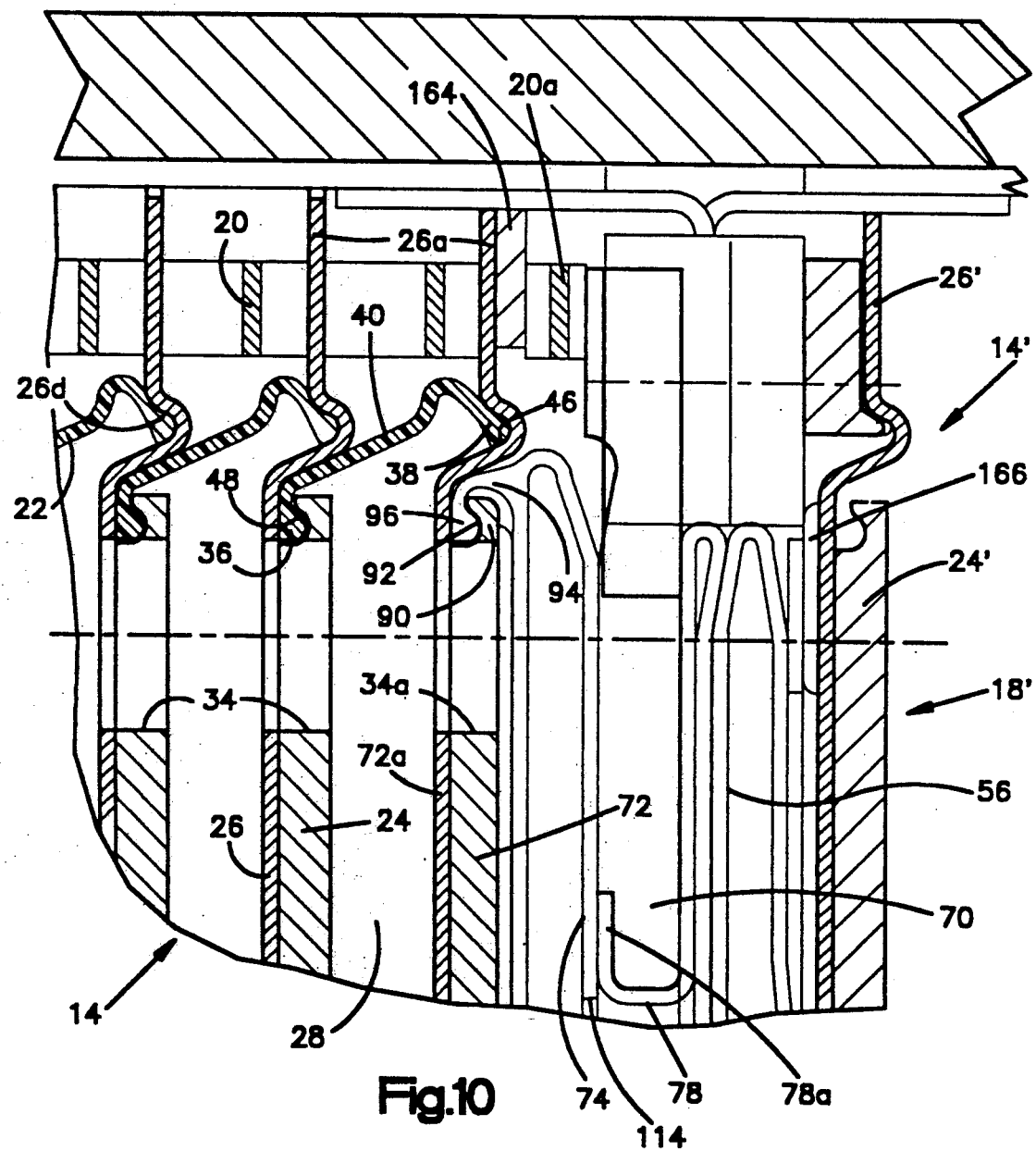

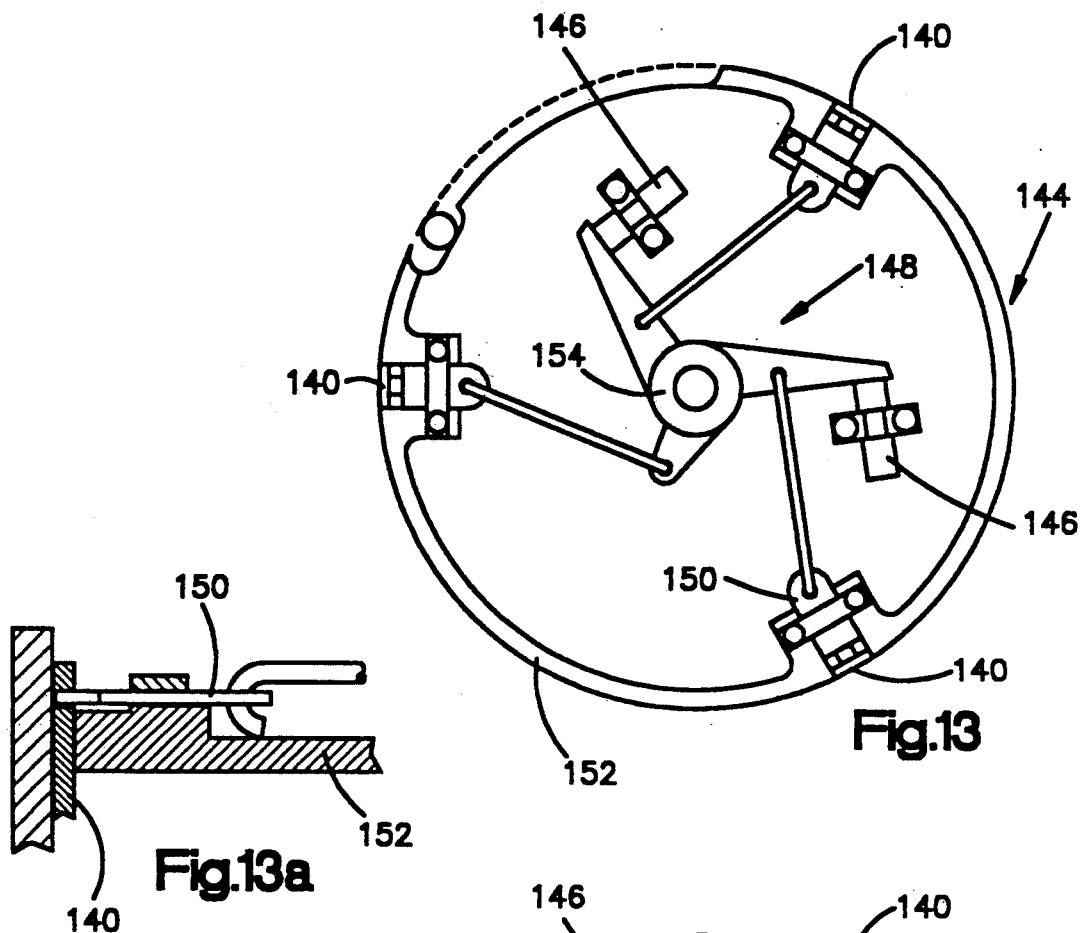
Fig.13
Fig.13a
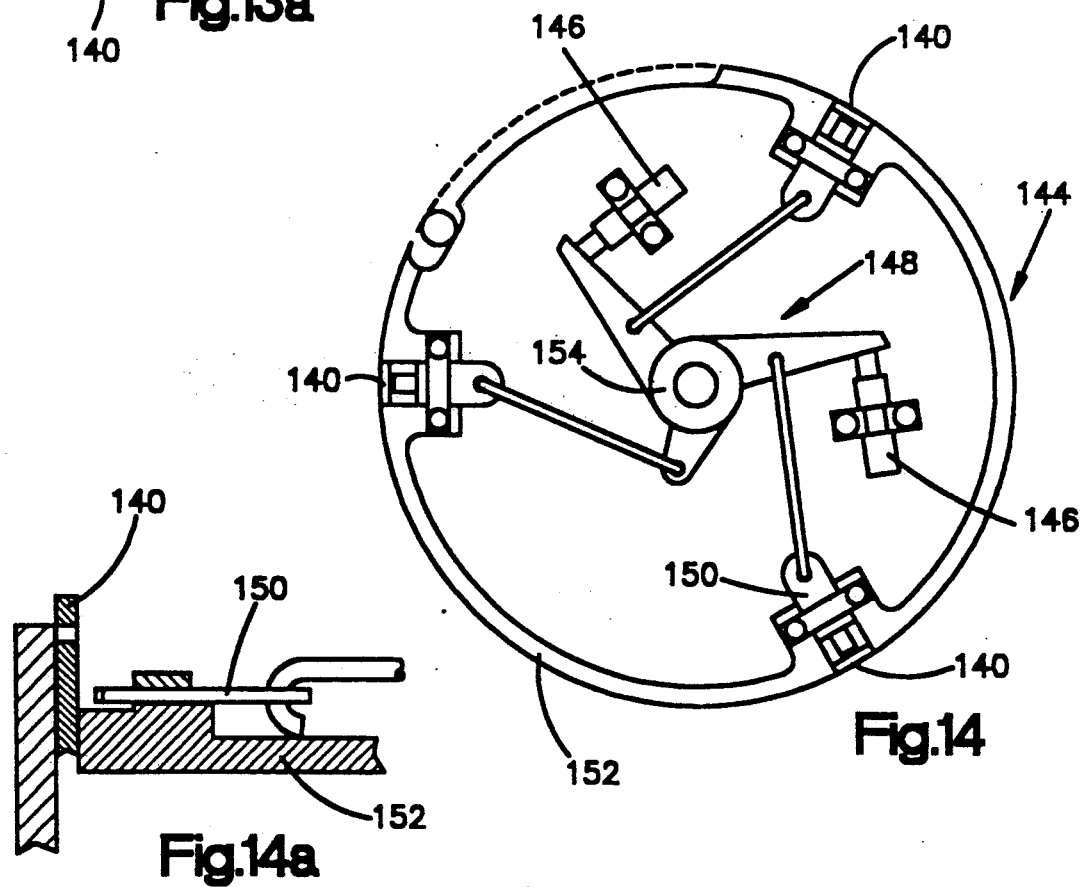
Fig.14
Fig.14a

RESERVE BATTERY

BACKGROUND OF THE INVENTION

1. Technical Field

The present invention relates to a compact reserve battery. The present invention is particularly applicable to a high power reserve battery in which the cells are connected in a bipolar fashion.

2. Description of the Prior Art

U.S. Pat. No. 4,842,964 discloses a reserve battery which comprises an elastomeric sealed container within the interelectrode space of the battery. The elastomeric container is in an expanded state and contains electrolyte. When punctured, the elastomeric container shrinks, simultaneously allowing electrolyte to flow out of the container into the interelectrode space, activating the battery.

U.S. Pat. No. 3,865,631 also discloses an elastomeric electrolyte chamber within the interelectrode space of a battery. The electrolyte chamber when punctured, releases electrolyte into the interelectrode space, similar to the structure of U.S. Pat. No. 4,842,964.

U.S. Pat. No. 4,695,520 discloses a reserve battery comprising an electrolyte storage chamber which is separated from the cell compartments by a rupturable disk. The chamber contains an expandable bellows. When the disk is ruptured, electrolyte starts to flow into the cell compartments. Compressed ga simultaneously expands the bellows expelling the remainder of the electrolyte into the cell compartments.

U.S. Pat. No. 4,642,275 discloses a reserve battery which includes a cell housing and a separate reservoir housing for storing electrolyte. A piston responsive to an externally applied pressure is movable in the reservoir housing to expel electrolyte from the reservoir housing into the cell housing. A burst disk separates the reservoir housing from the cell housing.

U.S. Pat. No. 3,437,528 discloses a reserve battery in which electrolyte is located above the electrode compartment. A spring actuated valve seals the electrolyte from the electrode compartment. The valve is held in its sealing mode by a locking pin. Removal of the locking pin causes the valve to shift to a non-sealing mode allowing electrolyte to flow into the electrode compartment.

U.S. Pat. No. 4,288,501 discloses separate electrode and electrolyte chambers. An air supply functions to force electrolyte from the electrolyte chamber into the electrode chamber for activating the battery. The battery can be inactivated by forcing the electrolyte from the electrode chamber back to the electrolyte chamber.

In all of the above prior art, except for U.S. Pats. Nos. 4,842,964 and 3,865,631, the use of separate electrolyte and cell housings substantially increases the size of the battery for a given power output. Many applications require as compact a reserve battery as possible. U.S. Pats. Nos. 4,842,964 and 3,865,631 disclose batteries which are relatively smaller than the other prior art reserve batteries. However, the batteries in U.S. Pats. Nos. 4,842,964 and 3,865,631 are not bipolar. High voltage requirements, for a large power output, require that the cells be connected in a bipolar or series fashion.

SUMMARY OF THE INVENTION

The compact reserve battery according to the present invention comprises a cell housing, an expandable cell stack contained within a first portion of said housing, and an electrolyte reservoir assembly contained within a second portion of said housing. The cell stack is expandable into the housing second portion, expansion of the cell stack displacing electrolyte from the electrolyte reservoir assembly into the cell stack, thereby activating the battery.

Preferably, the cell stack comprises a plurality of bipolar anode/cathode plates in an aligned relationship. The cell stack has a compressed mode and an expanded mode. Means are provided for holding the cell stack in its compressed mode, and for mechanically releasing the cell stack to its expanded mode. Springs positioned between the anode/cathode plates bias the cell stack to its expanded mode. When in its expanded mode, the cell stack defines a plurality of electrolyte chambers intermediate said plates which are in fluid communication with the electrolyte reservoir assembly.

The present invention also resides in a method for activating a reserve battery which comprises the steps of; positioning a cell stack within a cell housing, the cell stack having a compressed mode and an expanded mode, and being positioned in the cell housing in said compressed mode. An electrolyte reservoir assembly is also positioned within the cell housing. The electrolyte reservoir is positioned whereby electrolyte i displaced from the reservoir assembly upon expansion of the cell stack to its expanded mode. The method includes the steps of releasing the cell stack to its expanded mode and allowing electrolyte to flow from the electrolyte reservoir assembly to said cell stack with expansion of the cell stack.

BRIEF DESCRIPTION OF THE DRAWINGS

Further features of the present invention will become apparent to those skilled in the art to which the present invention relates from reading the following specification, with reference to the accompanying drawings, in which:

FIG. 3 is a sectional elevation view, taken along the same section line of FIG. 3a as FIG. 2, showing the cell module of FIG. 2 in a contracted mode;

FIG. 4 is a plan view of an anode of the cell module of FIGS. 2 and 3;

FIG. 4a is a sectional elevation view taken along line 4a–4a of FIG. 4;

FIG. 4b is an enlarged sectional view of a portion of FIG. 4a, taken along line 4b–4b of FIG. 4;

FIG. 5 is a perspective view of a wave spring, which is a component of the cell module of FIGS. 2 and 3;

FIG. 6 is a reduced-size plan view of an anode bellows seal, which is a component of the cell module of FIGS. 2 and 3;

FIG. 6a is an enlarged sectional view taken along line 6a–6a of FIG. 6;

FIG. 7 is a sectional elevation view of an electrolyte reservoir assembly, which is a component of the cell module of FIGS. 2 and 3, taken along line 7—7 of FIG. 7a;

FIG. 7a is a plan view of the electrolyte reservoir assembly of FIG. 7;

FIG. 8 is a sectional elevation view of an electrolyte bladder, which is a component of the electrolyte reservoir assembly of FIG. 7, and which is taken along line 8—8 of FIG. 8a;

FIG. 10 is an enlarged sectional elevation view of a portion of the cell module of FIGS. 2 and 3, with the cell module in an expanded mode;

FIG. 13 is a schematic plan view of a battery-activating mechanism in accordance with the present invention;

FIG. 13a is a sectional elevation view of a portion of the activating mechanism of FIG. 13;

FIG. 14 is a plan view of the activating mechanism of FIG. 13, in a released position; and FIG. 14a is a section elevation view of a portion of the mechanism of FIG. 14.

DESCRIPTION OF A PREFERRED EMBODIMENT

Figure 1:
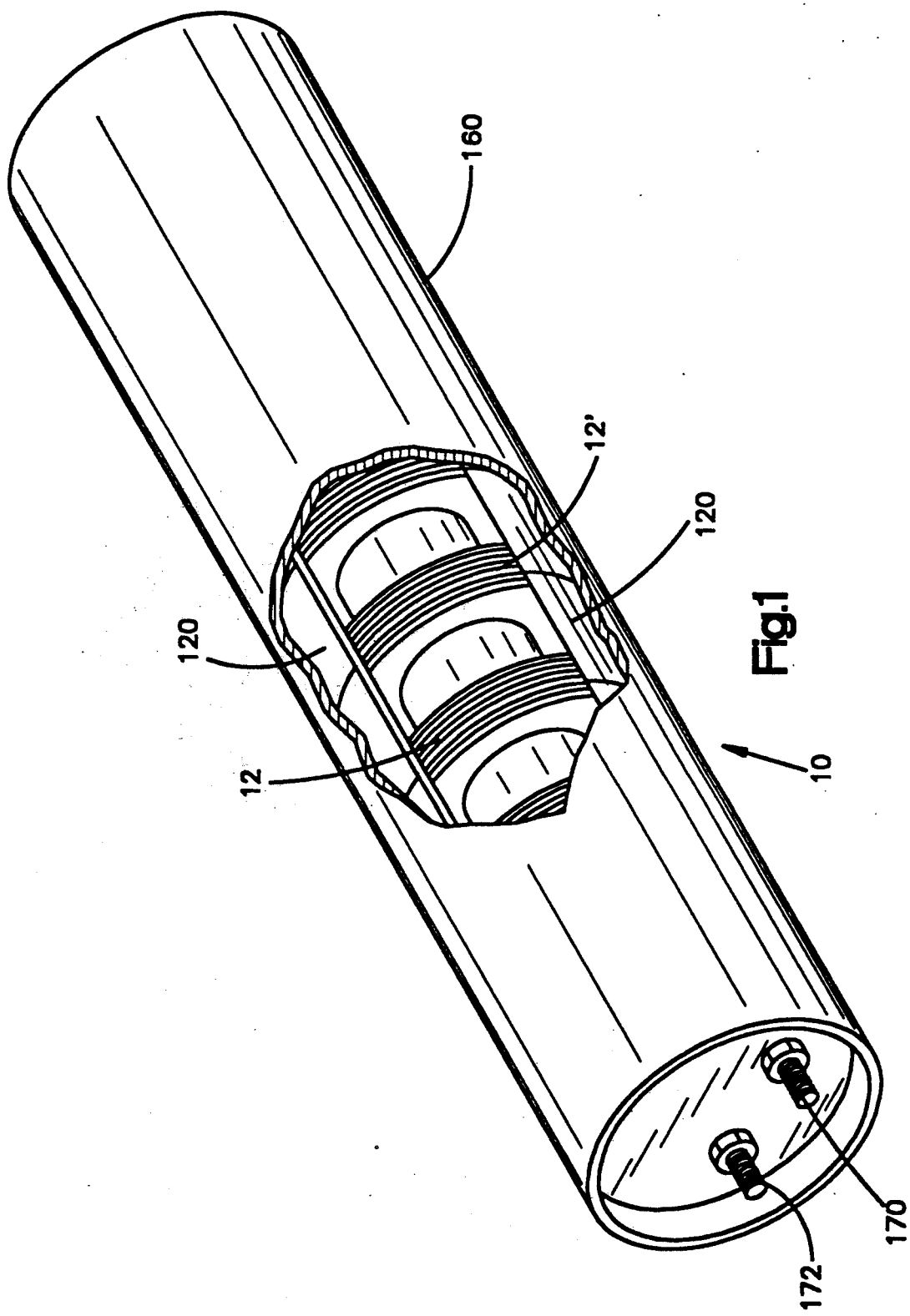
FIG. 1 is a perspective schematic view of a battery of the present invention showing a plurality of cell modules in a stacked relationship within the battery.

The battery 10 of the present invention is shown in FIG. 1. The battery comprises a housing 160. The housing, by way of example, has a cylindrical configuration. A part of the housing is broken away to show the interior of the housing. The housing 160 contains a plurality of cell modules 12 in an aligned stacked relationship. The cell modules 12 are shown in a contracted or compressed mode. In this mode, the battery is inactive. As will be described, each cell module 12 comprises a plurality of cells. The cells are connected in a bipolar fashion. When activated, the battery is capable of a high power output. By way of example, eight cell modules 12 can be stacked in series to provide a power output, for instance, 5,000 watts.

In the following description, reference will be made principally to one cell module 12. However, an adjacent cell module may also be explained. Components of the adjacent cell module which are the same as components of the one cell module will be given the same number, but differentiated with a prime.

Figure 2:
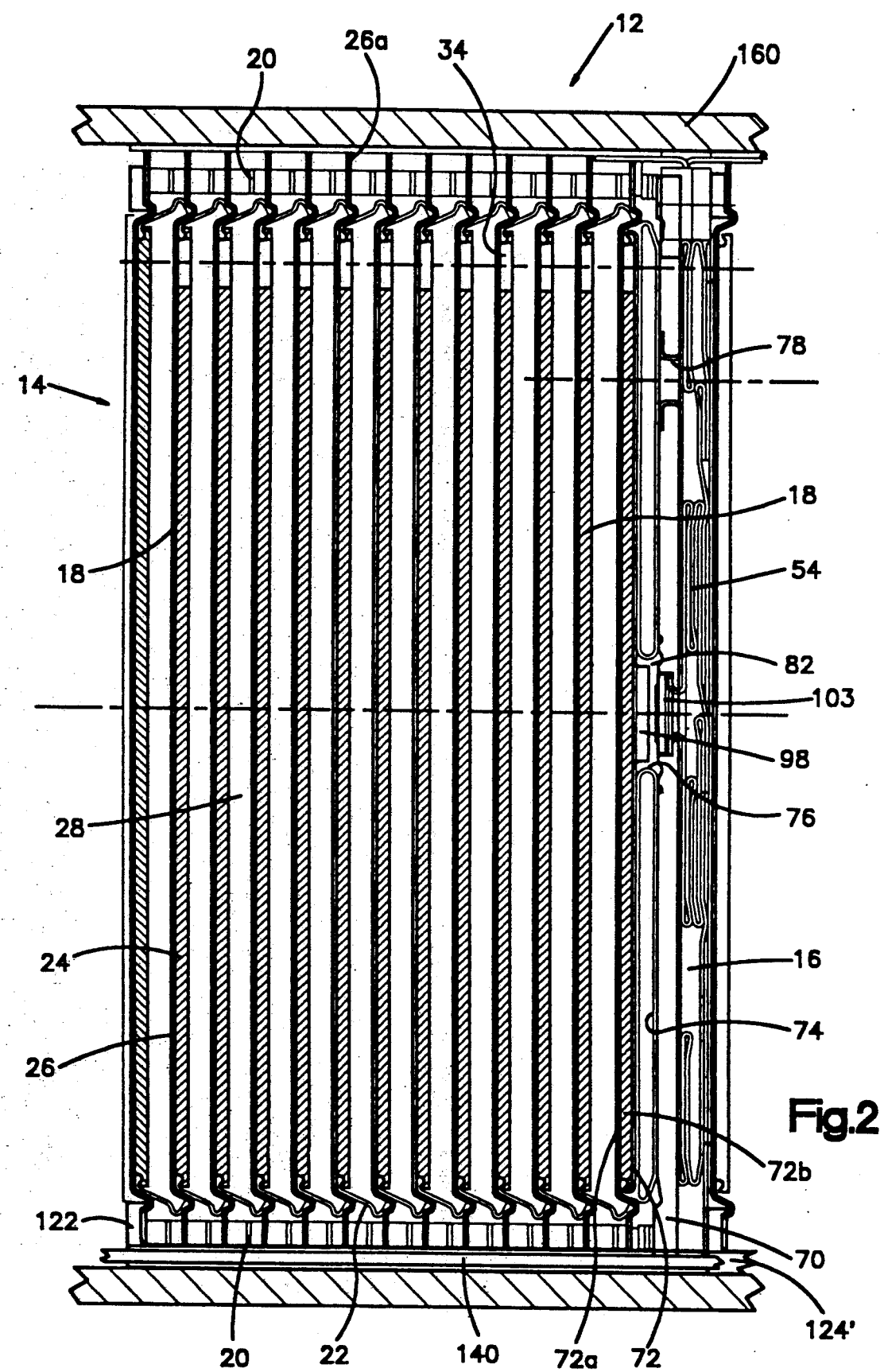
FIG. 2 is a sectional elevation view, taken along the section line 2—2 of FIG. 3a, of a cell module in an expanded mode, in accordance with the present invention.

Referring to FIG. 2, each cell module 12 is made up of two sub-assemblies, a cell stack 14, and an electrolyte reservoir assembly 16. The cell stack 14 is comprised of a plurality of anode/cathode bipolar plates 18, which are aligned in series in the cell stack 14, wave springs 20 which are interposed between successive anode/cathode bipolar plates 18, and a plurality of bellows seals 22.

Each anode/cathode plate 18 is an integral structure comprising an anode plate 26 and a cathode 24 bonded to the anode plate. Details of the anode plate 26 are shown in FIGS. 4, 4a and 4b. The anode plate 26, as shown in the FIGS., is preferably a circular plate made of an aluminum alloy. The anode plate 26 is stamped in the shape of a dish, as shown in FIG. 4a, with three annular fin-like extensions 26a, uniformly spaced around the anode plate, and a flat, shallow, circular mid-section 26b. As shown in the enlarged view of FIG. 4b, the anode 26 comprises an annular wave section 26c between the fins 26a and mid-section 26b. The wave section 26c defines a depression 26d on one side of the anode plate. The wave section 26c is configured so that the fins 26a are in a plane which is raised from the plane of the mid-section 26b. In a manner to be described, the fins 26a function as heat dissipating fins to dissipate the heat which is generated in the battery during discharge. Transfer of heat in this fashion is an efficient way of temperature control of the battery without resorting to recirculation of the electrolyte in the battery and cooling the electrolyte.

The anode plate 26 is a relatively thin stamping, for instance about 0.02 inch thick of a metal, alloy or intermetallic mixture. The anode plate by way of example is of pure aluminum (having a purity of about 99.99 percent) alloyed with a small amount of magnesium (about 0.8 weight percent) to reduce polarization, and indium or tin (about 0.2 weight percent) to reduce corrosion. Other metals that may be used in the anode plate 26 include zinc, cadmium, iron, beryllium, magnesium and lithium.

The cathode 24, FIG. 2 seats into the mid-section 26b of the anode plate 26, on the side of the anode plate which is opposite to that cf depression 26d (FIG. 4b). The cathode 24 coordinates with the anode plate 26, and therefor is a circular, flat structure which is substantially co-extensive with the mid-section 26b of the anode, extending up to wave section 26c. The cathode 24 is a reticulated metal structure which has been impregnated with chemically-prepared silver oxide by the method disclosed in U.S. Pat. No. 4,687,533, assigned to assignee of the present application. The disclosure of U.S. Pat. No. 4,687,533 is incorporated herein by reference. It is to be understood that the use of other metal oxides, e.g., nickel oxide, or oxide mixtures is also contemplated. The reticulated silver structure is bonded to the anode plate, in mid-section 26b, forming a bipolar connection between the anode and the cathode. The bonding can be by plating the structure onto the anode per the method of U.S. Pat. No. 4,687,533. Preferably, the cathode 24 is bonded to the anode plate 26 by adhesion with an electrically-conductive epoxy cement. It is important that the bonding process provide a process seal for protection of the interface of the anode and cathode from caustic attack during operation of the cell. That is, a silver metal or like plating of the reticulated cathode onto the anode plate, must be substantially porefree, or the epoxy cement must continuously coat the anode plate mid-section 26b. A unitized bipolar anode/cathode plate can be prepared in this fashion, and provide good electrical contact at the bipolar joint (the interface of the anode and cathode) without the external application of large pressures to hold the anode and cathode in close contact.

A test was conducted to demonstrate the effectiveness of the combination of aluminum and a metal oxide as anode and cathode ingredients, respectively. The cell comprised an aluminum anode and had a composite cathode comprising silver oxide in a reticulated nickel structure. The nickel was plated with silver, and silver oxide was pressed into the reticulated structure. The cell had an effective area of 27 $cm^2$, and a gap of 0.32 cm. The cathode was 0.32 cm thick. The cell contained 8.75 ml of an electrolyte. The electrolyte was primarily 7.5 M potassium hydroxide. The electrolyte also contained small amounts of a corrosion inhibitor (0.02 to 0.2 molar solution of sodium stannate) and an anti-foaming agent, in accordance with the disclosure of U.S. Pat. No. 4,925,744 assigned to the assignee of the present application. The anti-foaming agent used was a surfactant marketed by Dow Chemical Co. under the trademark "Dowex 1410". This surfactant is a perfluorinated hydroxyethylene. It is used in small amounts, for instance, about 0.5 to 20 ppm. About 2-3 ppm is preferred. The cell was operated at a current density of 288 mA/cm$^2$ and a temperature of 70° C. The cell ran for approximately eighteen minutes, at about 1.5 volts. The cell voltage then declined abruptly to zero. This test demonstrated that an aluminum anode and a cathode comprising silver oxide was an effective combination for a battery.

The cell stack 14, in FIG. 2, is shown in an expanded mode in which the anode/cathode bipolar plates 18 are separated by electrolyte chambers 28. Each electrolyte chamber with an anode plate 26 on one side and a cathode 24 on the opposite side defines an individual cell of a cell stack 14. Current flows from one anode plate 26 of a bipolar plate 18 through the bipolar connection to the cathode 24 and then through the electrolyte t the anode plate of an adjacent bipolar plate 18. In the example of FIGS. 2 and 3, each cell module is comprised of twelve cells.

The expansion of the cell stack to the mode shown in FIG. 2 is caused by wave springs 20 interposed between each of the anode/cathode plates 18. Details of a wave spring are shown in FIG. 5 The wave spring is a thin annular washer. The washer has a normal wave configuration which comprises alternating peaks 30 and depressions 32. The wave springs are deformable and can be flattened to a flat configuration. Referring to FIG. 2, a wave spring 20 is positioned between each anode/cathode bipolar plate 18, engaging each plate around the periphery of the plate, in the fins 26a (FIG. 4b) about midway between the wave section 26c and the edge of the fins. In FIG. 2, the vertical lines, to which the lead line 20 is directed, represent a section view of a wave spring cut along the section line of FIG. 3a. The horizontal lines extending from the vertical lines 20 represent surfaces of the wave spring viewed from the section view taken in FIG. 3a. As shown in FIG. 2, successive anode plates are held apart from each other by the wave springs 20, when the cell stack is in an expanded mode, a wave depression 32 of a wave spring engaging one side of one anode plate 26, and a wave peak 30 of the wave spring engaging the opposite side of an adjacent anode plate 26.

Since the wave springs 20 are deformable, a cell stack 14 can be depressed from its expanded state, shown in FIG. 2 to a compressed state, shown in FIG. 3, wherein the bipolar plates 18 are contiguous with each other.

The wave springs 20 can be made of a dielectric plastic material which is resilient and resistant to electrolyte. A preferred composition of a wave spring is spring steel, coated with a dielectric coating, such as Teflon. The Teflon coating keeps the spring steel from making contact with the anodes and shorting the cell. The Teflon coating also functions as a bearing surface to minimize friction between the springs 20 and anode plate 26 during activation.

Figure 11:
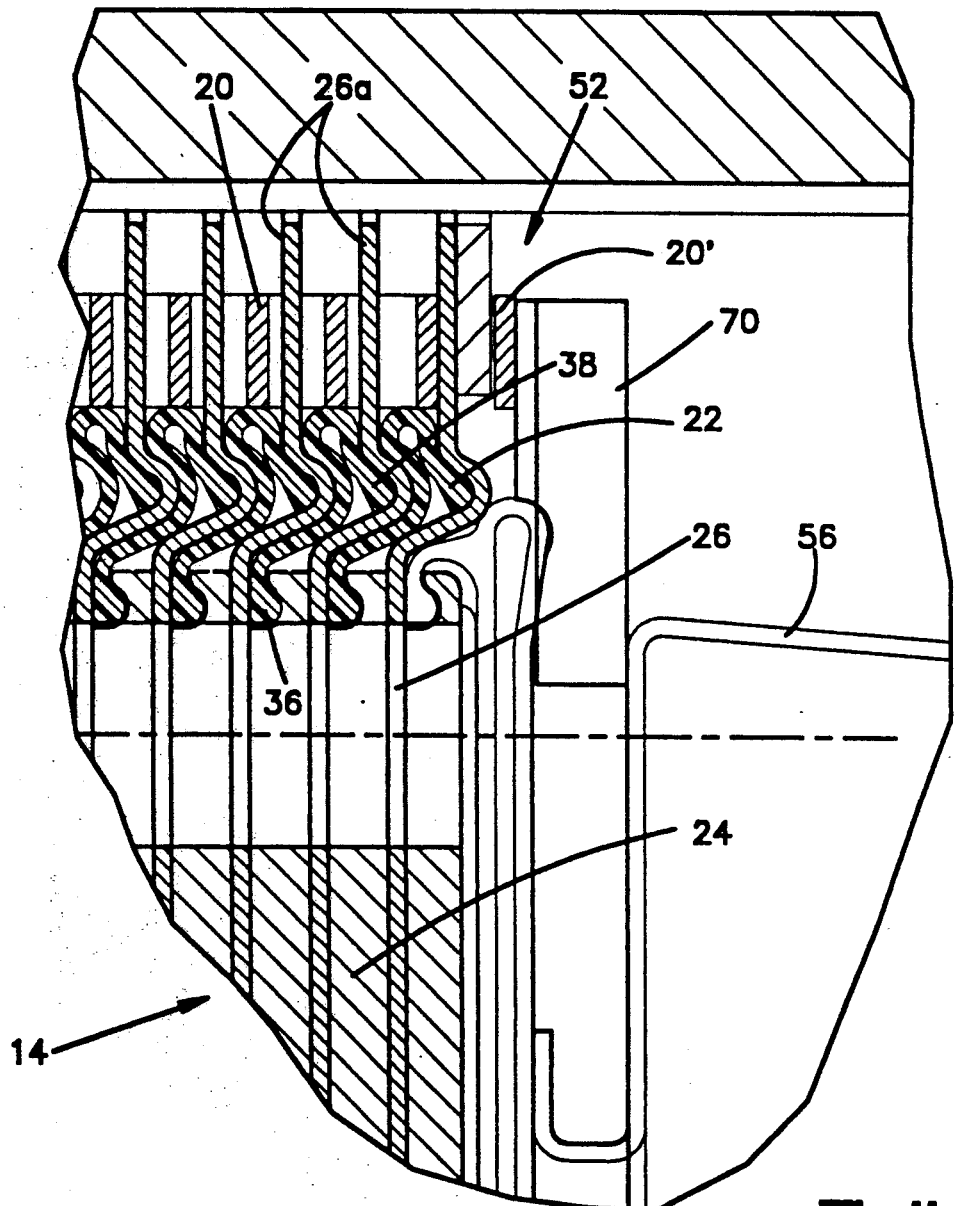
FIG. 11 is an enlarged sectional elevation view of a portion of the cell module of FIGS. 2 and 3, with the cell module in a contracted mode.

Referring to FIG. 2, a plurality of electrolyte chambers 28 exist between successive anode/cathode plates 18. These chambers 28 are sealed by bellows seals 22. The seals 22 are molded of a flexible elastomeric material resistant to electrolyte and the environment. One suitable elastomeric material is an ethylene-propylene terpolymer (e.g., EPDM). Details of the seals are shown in FIGS. 6 and 6a. Each seal 22 is an annular ring which has a cup-shaped cross section as shown in FIG. 6a, with an annular rib 36 at one edge of the seal, and an annular rib 38 on the opposite edge of the seal. Between the ribs 36 and 38, the seal has a flexible shank 40 adjacent rib 36 and an outward bow 42 adjacent rib 38. Details of the assembly of the seals 22 to the anode/cathode plates 18 are shown in FIGS. 10 and 11. Referring to FIG. 10, the anode plates 26 are configured at depression 26d, to receive and retain rib 38 of one of the anode bellows seals 22. As shown in FIG. 10, the reticulated cathodes 24 are undercut with an annular slot 48 around their periphery adapted to receive and retain rib 36. Thus, each seal 22 extends between an anode depression 26d of one anode/cathode plate 18 to a cathode slot 48 of an adjacent anode/cathode plate, sealing each electrolyte chamber 28. FIG. 11 shows a cell stack in a contracted mode whereas FIG. 10 shows a cell stack in an expanded mode. The configuration of each seal 22 allows it to deform to a compressed bowed shape shown in FIGS. 11 and 6a, to the more flattened expanded shape shown in FIG. 10.

Figure 8A:
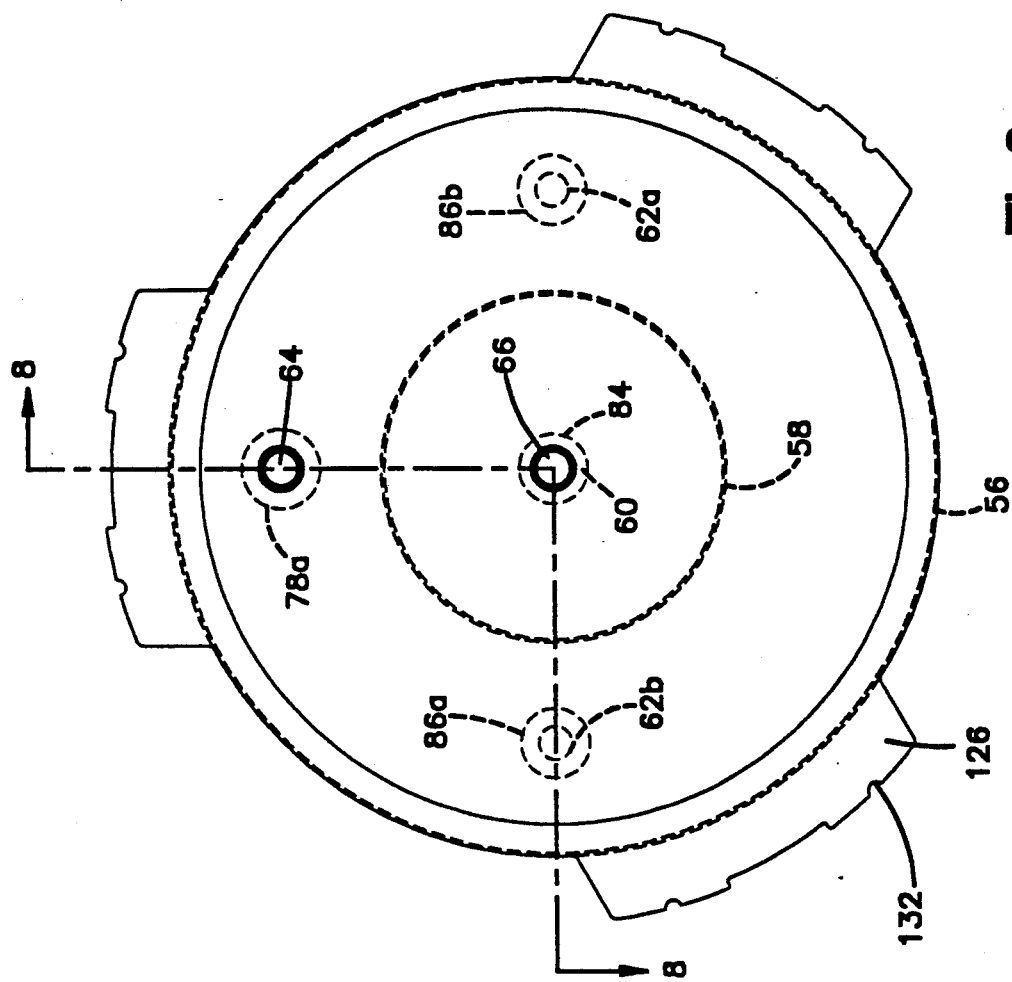
FIG. 8a is a plan view of the electrolyte bladder of FIG. 8.

Details of the electrolyte reservoir assembly 16 are best seen with reference to FIGS. 3, 7, 7a, 8 and 8a. These FIGS. show the reservoir assembly 16 or parts thereof in an expanded mode, in contrast to FIGS. 2 and 10 wherein the reservoir assembly 16 is in a compressed mode. The reservoir assembly 16 is defined on one side by a valve assembly 52 (FIG. 3) and on the opposite side is confined by an anode/cathode plate 18, (FIG. 3) of an adjacent cell stack 14'. In FIG. 3, only the adjacent anode/cathode plate 18', comprising anode plate 26' and cathode 24', of the cell stack 14' is shown. A bladder assembly 54 is positioned between the valve assembly 52 and the anode/cathode plate 18'. The bladder assembly 54 comprises, referring particularly to FIG. 8 and also FIGS. 7, 7a, and 8a, a donut-shape bladder 56 which circumscribes an inner, generally cylindrical, bladder 58. The inner bladder 58 comprises an opening 60 which faces in the direction of the valve assembly 52 (FIG. 7). The opening 60 is axially centered with respect to the valve assembly and bladder assembly. The donut-shaped bladder 56 comprises two openings 62a and 62b, which are laterally offset, as shown in FIG. 8a, with respect to opening 60. The two openings 62a and 62b face the valve assembly 52. As is evident from FIGS. 8 and 8a, the donut-shaped bladder 56 has a larger capacity than the inner bladder 58, necessitating two openings as compared to one opening for the inner bladder 58.

In a manner to be described in more detail, an activating mechanism holds the cell module 12 initially in the configuration shown in FIG. 3, in which the cell stack 14 is in a compressed mode, and the reservoir assembly 16 is an expanded mode filled with electrolyte. On activation, the activating mechanism releases the cell stack 14. This allows wave springs 20, positioned between each bipolar plate 18, to expand the cell stack 14 to the expanded mode shown in FIG. 2. Expansion of the cell stack 14 compresses the reservoir 16 expelling electrolyte from the reservoir assembly into the cell stack.

The purpose of two bladders is to provide multiple electrolyte ingredients to the cell stack 14, which can be separately stored, and which, when mixed, will react and add heat to the cell stack, from heat of reaction and/or heat of dilution. It is contemplated, that the battery of the present invention may be used and stored under extremely cold, ambient conditions. The multiple electrolyte ingredients, when mixed, can provide heat to the battery which increases the rate of start-u of the battery.

By way of example, the outer donut-shaped bladder 56 can contain a base such as an alkali metal hydroxide. A preferred alkali metal hydroxide is potassium hydroxide. Other bases useful in the present invention include lithium hydroxide and sodium hydroxide The inner bladder 58 can contain an acid, typically, an inorganic acid. A preferred inorganic acid is sulfuric acid. Other acids useful in the present invention include perchloric acid, phosphoric acid and methyl sulfonic acid.

The two bladders 56 and 58 keep the electrolytes, e.g., potassium hydroxide and sulfuric acid, separate until activation of the battery When mixed, the two electrolytes heat up due to neutralization of the acid with the base, and also from heat of dilution This heat in turn warms the battery, increasing the rate of start-up of the battery.

The concentrations of the base and acid will affect the heat input into the battery The heat input is maximized by maximizing the amount of base reacting with the acid. The heat generated by heat of dilution contributes to a lesser extent to the heat input into the battery when the amount of base reacting with the acid is maximized. A maximum amount of base reacting with the acid is most readily obtained by using a maximum concentration of base. For instance, it has been found that a high heat input can be obtained by mixing a 12 M potassium hydroxide solution with a 4 M sulfuric acid solution. A less concentrated base, requiring less acid, may be used if less heat input is desired. It is also to be understood that there will be taken into account a sufficiency of free hydroxyl ion for desirable battery discharge characteristics when considering these concentrations.

Preferably, the concentration of the base, following mixing, is in the range of about 6 to 10 M, more preferably about 7 to 8 M, e.g. 7.5 M. This controls, to a degree, the relative amounts of base and acid used. For instance, mixing a 12 M base (e.g., potassium hydroxide) with a 4 M acid (e.g., sulfuric acid) requires a weight ratio of about 4.1:1 base to acid to obtain a base concentration, i.e., a free hydroxyl ion concentration, following mixing, of about 7.5 M.

It is possible to use a higher concentration of base, than 12 M, and produce more heat. However, a concentration above about 12 M raises the freezing point of the base to a temperature above about 2° C., so that for some applications, a base concentration of 12 M becomes the practical upper limit.

If less heat is desired, than obtained from the reaction of potassium hydroxide with sulfuric acid, an acid having a lower heat of reaction than sulfuric acid can be used as the second component in the inner bladder 58. Also, an ingredient which does not react with the potassium hydroxide, but only dilutes the potassium hydroxide, providing only heat of dilution, can be used as the second component in the inner bladder 58. Examples o components, which when mixed with potassium hydroxide, provide only a heat of dilution, are water, an alcohol solution, and a salt solution.

However, the choice of the second electrolyte component depends, to a degree, on the service intended for the battery. The two electrolytes, 12 M potassium hydroxide and 4 M sulfuric acid have good storage characteristics. Potassium hydroxide (12 M) freezes at about −30° C. Sulfuric acid (4 M) freezes at about −44° C. Thus, the battery of the present invention, using these two electrolytes, is capable of activation at temperatures as low as −30° C.

It should be apparent that, if desired, only a single electrolyte (base) contained in a single bladder, can be used. A single electrolyte would be used where heat at start-up of the battery is not required. If only a single electrolyte, e.g., potassium hydroxide is used, the concentration of the potassium hydroxide preferably is about 7.5 M.

A test was conducted using 12 M potassium hydroxide and 4 M sulfuric acid. The electrolyte composition, before mixing, comprised 80.4% by weight potassium hydroxide and 19.5% by weight sulfuric acid. The composition also contained about 0.1% of 0.03 M sodium stannate, as a corrosion inhibitor, and an anti-foaming agent. One suitable anti-foaming agent is a surfactant marketed by Dow Chemical Co. under the trademark "Dowex 1410". This surfactant, as mentioned above, is a perfluorinated hydroxyethylene. Again, it is used in small amounts, for instance about 0.5 to 20 ppm, with about 2–3 ppm being preferred.

The mixed electrolyte in the amount of 150 ml was placed in a test cell comprising aluminum as the anode coupled with an air cathode. The cell had a configuration similar to that shown in U.S. Pat. No. 4,925,744, assigned to the assignee of the present application. The cell gap was 1.14 cm. The cell was operated at 70° C. using a current density of 150 mA/cm$^2$. The cell voltage was measu ed for a period of 120 minutes. The cell voltage initially was 1.4 volts, declining to about 1 volt at the end of the test period. This is an equivalent performance to that which is obtainable using a conventional 7.5 M potassium hydroxide electrolyte. This test demonstrated that the mixed electrolyte of the present invention is an effective battery electrolyte.

Figure 8:
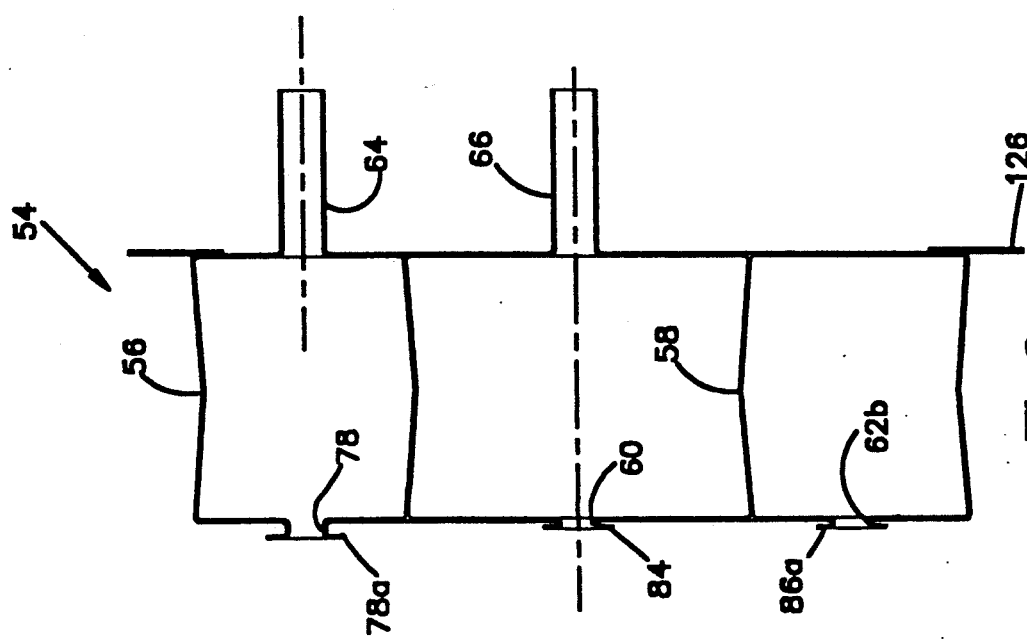

The bladders 56, 58 are flexible and resistant to the electrolytes. One suitable bladder material is Teflon. FIGS. 8 and 8a show the bladder assembly 54 in an extended, unfolded shape. In this shape, the bladders 56, 58 have fill ports 64 and 66 communicating with the interior of the bladders 56, 58 respectively, for introducing potassium hydroxide and sulfuric acid into the bladders. The fill port 66 is axially centered with respect to the inner bladder 58 and is connected to the side of the inner bladder 58 which is opposite the side having port 60. The fill port 64 is radially disposed, with respect to port 66, and is connected to the side of the donut-shaped bladder 56 opposite to the side having ports 62a, 62b. After filling the bladders, the fill ports 64, 66 are welded closed and folded down, as shown in the assembly drawings, for instance, FIG. 3. This permits the bladder assembly to be positioned compactly within the reservoir assembly area 16, and also seals off the bladders 56, 58, at the fill ports 64, 66.

Referring to FIG. 7, the valve assembly 52 comprises a valve plate 70, a mixing plate 72, and a balancing bladder 74 sandwiched between the valve plate 70 and the mixing plate 72 as well as a vent 180 (FIG. 7a). The mixing plate 72 is a circular plate which has a configuration which is essentially the same as the configuration of an anode/cathode plate 18. This can be seen in FIG. 2.

The mixing plate 72 comprises an anode plate 72a, which has the same configuration as an anode plate 26, and a mixing surface 2b, which has the same configuration as a cathode 24 but, in the cell module 12 of the present invention, does not function as a cathode, as will be described. The mixing surface 72b is not a silver-filled reticulated structure, but rather is a light weight cylindrical piece. Its function is simply to provide a surface on which the electrolytes from bladders 56, 58 impinge and mix. The mixing surface 72b is adhered on one side, for instance with an epoxy glue, to the anode plate 72a. Referring to FIGS. 7 and 7a, the mixing surface 72b has on its exposed side a raised axially positioned node 98. The node 98 has a flattened surface which faces the valve plate 70, and which functions as a stopper surface, in a manner to be described. The mixing surface 72b also has two nodes 98a and 98b, configured similar to node 98, having flattened exposed surfaces which also face the valve plate 70 and function as stopper surfaces. In FIG. 7, only one of the nodes 98a is shown. As is evident from FIG. 7 and 7a, the nodes 98, 98a and 98b are aligned with the openings 60, 62a and 62b of the bladder assembly of FIGS. 8 and 8a.

The valve plate 70 also is a flat plate which has a diameter slightly less than that of the anode plate 72a, as shown in FIGS. 7 and 7a. The valve plate 70 has an axially centered opening 102 which aligns with opening 60 of the inner bladder 58 of the bladder assembly, and two openings 102a and 102b, displaced from the opening 102, which align with openings 62a, 62b of the donut-shaped bladder 56 of the bladder assembly. The valve plate 70 and the bladder assembly 54 are designed to be joined together. Referring to FIG. 8, the bladder assembly at opening 60 is formed to define an outer, annular lip 84. When the bladder assembly 54 and the valve plate 70 are joined, the lip 84 is inserted into the axial opening 102 of the valve plate so that it folds around and encircles the opening 102. Similarly, the openings 62a and 62b (FIG. 8a) of the bladder assembly 54 have annular lips 86a, 86b designed to encircle the openings 102a, 102b of the valve plate 70, when the bladder assembly and valve plate are joined.

Referring to FIGS. 7 and 7a, the nodes 98, 98a and 98b are adapted to seat against a U-shaped, spring energized ring seal. In FIG. 3, one such ring seal is shown at 103. The ring seals in turn seat against the annular lips 84, 86a, 86b (FIG. 8) of the bladders 56, 58. When the bladders 56, 58 are in the expanded state shown in FIG. 8, the nodes 98, 98a and 98b thus close the openings 60, 62a and 62b of the bladders, as well as openings 102, 102a and 102b of the valve plate. This prevents the flow of electrolytes from the bladders 56, 58 through these openings when the nodes 98, 98a, 98b are so seated. When the mixing plate 72 is separated from the bladder assembly 54, and valve plate 70, in a manner to be described, the respective openings are freed, allowing electrolyte to flow from the bladder assembly through these openings.

Figure 9:
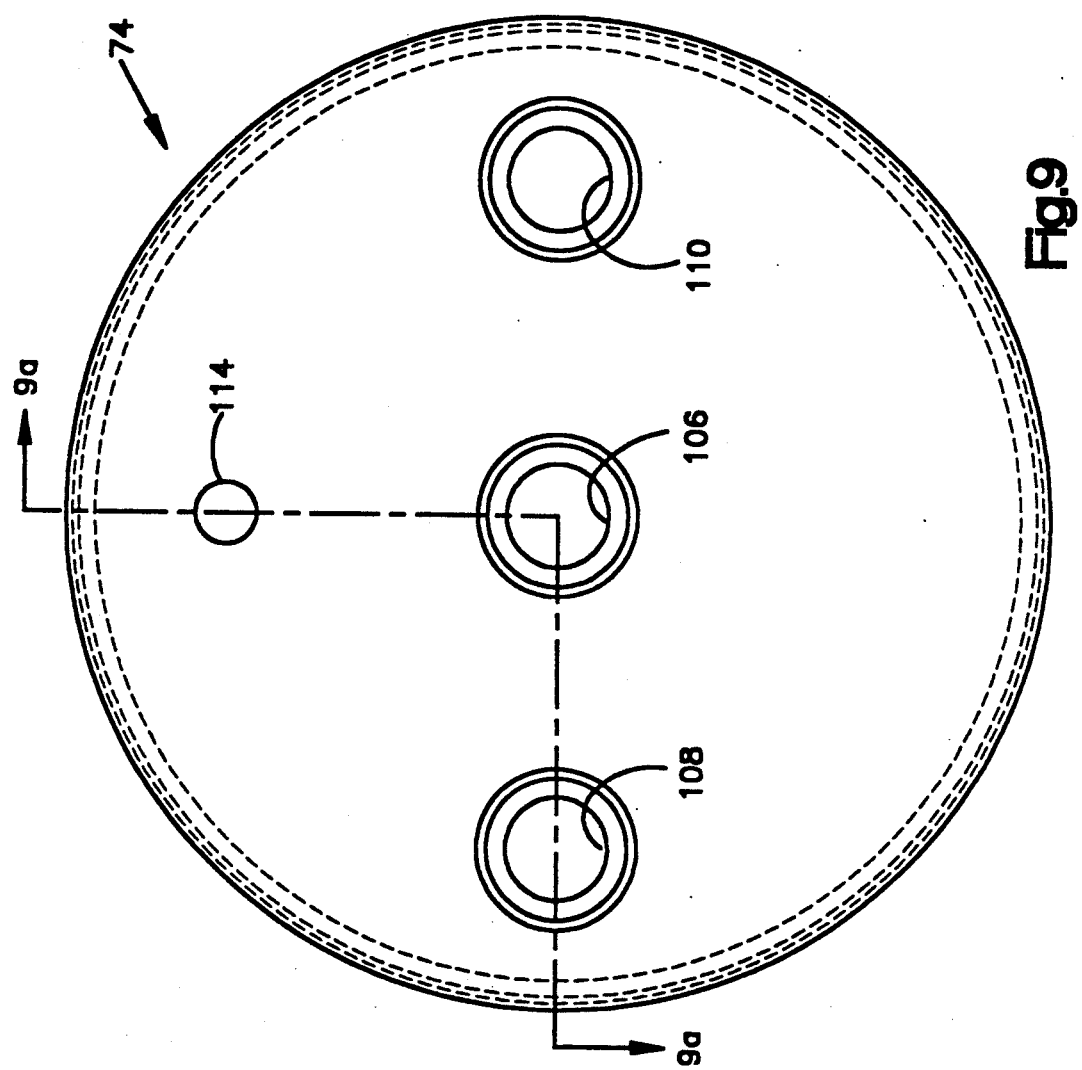
FIG. 9 is a plan view of a balancing bladder, which is a component of the electrolyte reservoir assembly of FIG. 7.
Figure 9A:
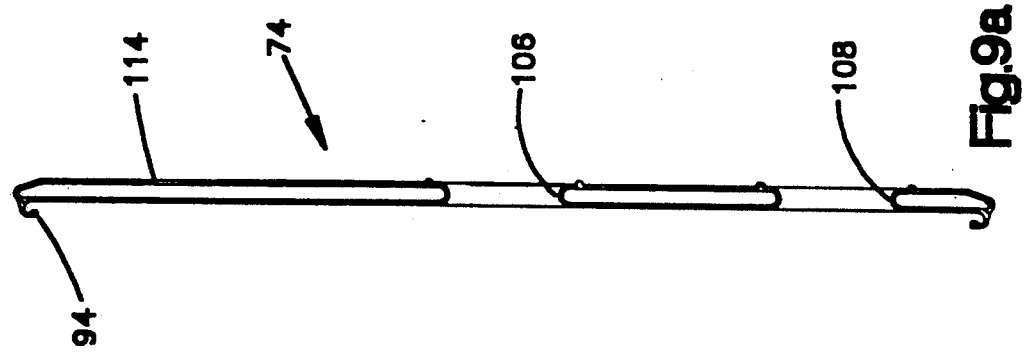
FIG. 9a is a sectional view taken along line 9a—9a of FIG. 9.

Separation of the mixing plate 72 from the valve plate 70 and bladder assembly 54 is caused principally by expansion of a wave spring 20a which is positioned, referring to FIG. 10, between the valve plate 70 and the mixing plate 72. Separation of the mixing plate 72 from the bladder assembly 54 and the valve plate 70 is assisted in part by a balancing bladder 74, FIG. 7. The balancing bladder 74 is positioned, as mentioned, between the valve plate 70 and the mixing plate 72, as shown in FIG. 7. Details of the balancing bladder 74 are shown in FIGS. 9 and 9a. The balancing bladder 74 is essentially a donut-shaped member having an axial opening 106, FIG. 9. The balancing bladder also has off-center openings 108 and 110, also shown in FIG. 9. All three openings 106, 108 and 110 extend completely through the balancing bladder and are not in communication with the interior of the balancing bladder, as shown in FIG. 9a. The axial opening 106 extends between opening 102 of the valve plate 70 and the mixing plate 72. The openings 108, 110 extend between openings 102a, 102b of the valve plate 70 and the mixing plate 72. This permits electrolyte to flow from the electrolyte bladder assembly 54 through the balancing bladder to the mixing surface 2b of the mixing plate 72 when the mixing plate is separated from the valve plate 70 as shown in FIG. 7. Referring to FIG. 7, it can be seen that the diameter of the openings 106, 108 and 110 of the balancing bladder is sufficient for these openings to accept the nodes 98, 98a, and 98b of the mixing plate without interference, in turn allowing the nodes 98, 98a and 98b to seat against the seals 103 of lips 84, 86a and 86b of the bladder assembly 54.

FIG. 7 shows the balancing bladder 74 in an expanded state. When in a compressed state, as shown in FIG. 3, the balancing bladder is essentially flattened, allowing the nodes 98, 98a, 98b to seat against the seals 103 of lips 84, 86a and 86b of bladder assembly 54. FIG. 3 shows axial node 98 against seal 103 of lip 84 of the inner bladder 54, sealing opening 60.

Referring to FIGS. 9 and 9a, the balancing bladder 74 also comprises an opening 114 which is off-center as with openings 108 and 110. The opening 114, however, is displaced 90°, as shown in FIG. 9, with respect to openings 108 and 110. Referring to FIG. 9a, the opening 114 extends into the interior of the balancing bladder 74. This opening 114 is aligned with and is in communication with an opening 78 (FIG. 8) of the donut-shaped bladder 56. The donut-shaped bladder 56 has at opening 78 an annular lip 78a. The lip 78a encompasses and is wrapped around an opening 102c (FIG. 7) of the valve plate 70. Whether the valve assembly 52 is in an expanded state or a contracted state, the lip 78a of opening 78 of the donut-shaped bladder is pressed against the opening 114 of the balancing bladder. Preferably, the donut-shaped bladder 56, at lip 78a, and the balancing bladder 74 at opening 114 are welded together, for instance by heat fusion.

In operation, following activation of the battery, the bladder assembly 54 is compressed with expansion of the cell stack 14 into the area occupied by the bladder assembly. This can be seen from a comparison of the expanded bladder assembly 54 of FIG. 3 and the compressed bladder assembly 54 of FIG. 2. Compression of the bladder assembly 54 causes a portion of the electrolyte in the donut-shaped bladder 56 to be displaced under pressure into the balancing bladder 74 through aligned openings 78, 114. The battery of the present invention may be used in a marine application. A high external pressure can be expected in a marine application. A wave spring 20a (FIG. 10), as mentioned, is positioned between the valve plate 70 and the mixing plate 72. The expansion of the balancing bladder 74 counterbalances the external pressure, and assists the wave spring 20a in separating the valve plate 70 from the mixing plate 72.

During separation of the valve plate 70 and the mixing plate 72, the two electrolyte solutions are displaced from their respective bladders 56, 58 into the void 82

(FIG. 1) created by the separation of the valve plate 70 and mixing plate 72. The electrolyte solutions are mixed and any ensuing exothermic reaction raises the electrolyte temperature. The force of the wave springs 20 force the mixed solution between the balancing bladder 74 and the mixing plate 72 into the cell stack 14.

The flow path for flow of electrolyte into the cell stack 14 can be seen by referring to FIGS. 9a and 10. The balancing bladder 74 is sealed to the mixing plate 72 by means of an annular flange 94. The flange 94 extends around the entire circumference of the balancing bladder, and has, at its end, an enlarged nib 96 (FIG. 10) which is received into an undercut area 92 around the periphery of the mixing plate 72. The configuration of the flange 94 and its use thus are similar in this respect to the configuration and use of the bellows seal 22.

A series of openings 34 (FIGS. 2, 3, 4, and 10), which may be slightly offset from one another but are most typically aligned are positioned near the top of each of the anode/cathode bipolar plates 18. A similar aligned hole 34a (FIG. 10) is provided near the upper edge of the mixing plate 72. The flow from the donut-shaped bladder 56 is through openings 62a, 62b (FIGS. 8 and 8a) and through openings 102a and 102b of the valve plate 70 into the space between the mixing plate 72 and the balancing bladder 74 (FIG. 10). Some of the flow from the donut-shaped bladder 56 passes through opening 78 into the balancing bladder, expanding the balancing bladder, and assisting in separation of the mixing plate nodes 98a, 98b from the balancing bladder openings 62a, 62b. This expansion of the balancing bladder 74 maintains a pressure equilibrium on opposite sides of the valve plate, so that the only force required to be overcome by the cell stack wave springs 20, 20a is in essence the external hydrostatic pressures imposed upon the three node areas 98, 98a and 98b. Simultaneously with the flow of electrolyte from the donut-shaped bladder 56, electrolyte also flows from the inner bladder 58 through axial opening 76 and into the same space between the balancing bladder and the mixing plate. Here the two electrolytes are mixed, and then pass through opening 34a (FIG. 10) of the mixing plate 72 into the cell stack 14. This flow is confined to the cell stack by the bellows seals 22, and balancing bladder flange 94, sealed to the mixing plate 72. The flow is initiated by the expansion of the cell stack 14, due to the natural bias of the wave springs 20 and 20' within the cell stack. Referring to FIGS. 10 and 11, this expansion of the cell stack 14 urges the valve assembly 52 to the right, from the cell compressed position shown in FIG. 11, to the cell expanded position shown in FIG. 10. This causes compression of the bladder assembly 54, expelling electrolyte from the bladders 56, 58.

Figure 12:
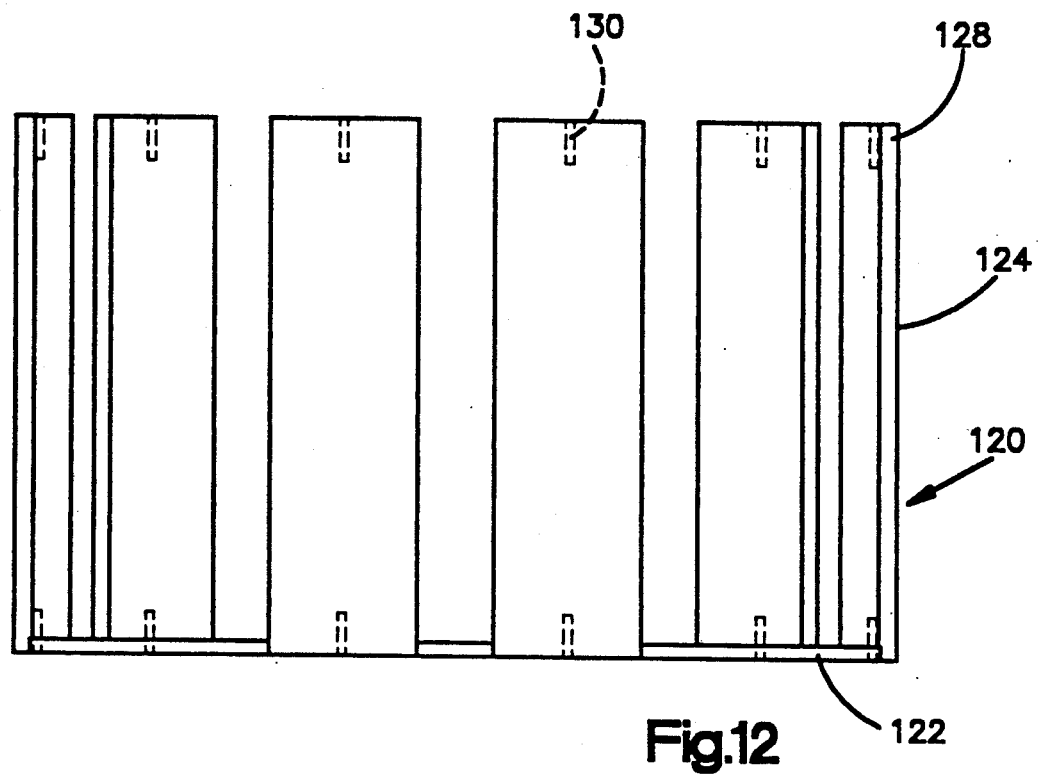
FIG. 12 is an elevation view of a cell cage, which is a component of the cell module of FIGS. 2 and 3, in accordance with the present invention.
Figure 12A:
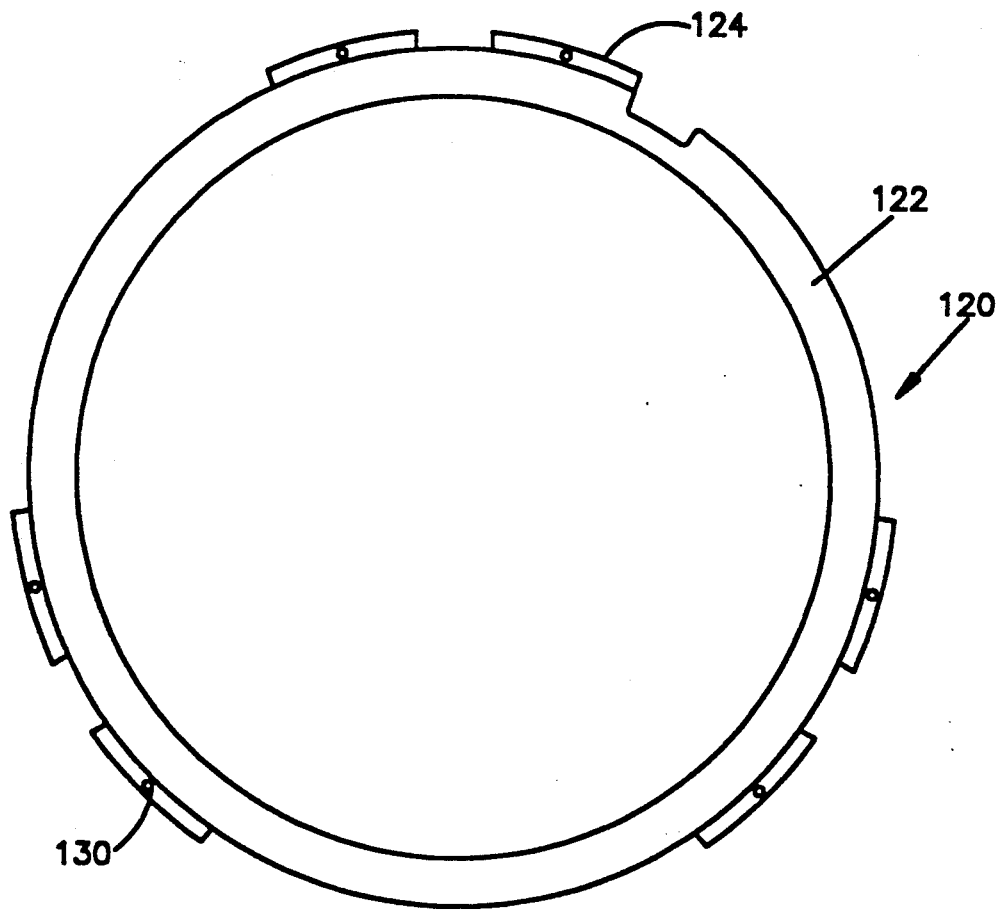
FIG. 12a is an end view of the cell cage of FIG. 12, looking from the inside out.

To assemble each cell module 12, 12', a cage 120, FIGS. 12 and 12a, is provided. The cage 120 comprises an annular ring 122 from which a plurality of spaced-apart fingers 124 extend in an axial direction. In the drawings of FIGS. 12, 12a, six fingers 124 extend axially in pairs which are about 120° apart. A preassembled cell module is simply seated within a cage 120 as shown in FIG. 3. The cell module is clamped (with a clamp, not shown) so that the cell stack 14 is in a compressed mode. FIG. 3 shows annular ring 122 and fingers 124. The endmost anode/cathode plate 18, removed from the electrolyte reservoir assembly 16, is seated against the inside of annular ring 122. Referring to FIG. 8, the bladder assembly 54 has affixed, to its fill nozzle side, annular spaced-apart flanges 126. The flanges are also shown in FIG. 8a. Referring again to FIG. 3, these flanges 126 are clamped between the free ends 128 of fingers 124 and the ring 122' of a next cell module. In seating a cell module within a cage 120, so that an endmost anode/cathode plate bottoms against ring 122, the bladder assembly flanges 126 engage the free ends 128 of the cage fingers 124. This extends the electrolyte reservoir assembly 16 to the extended configuration shown in FIG. 3, and allows the bladder assembly 54 to be filled through ports 64, 66 The ports are welded, closing the ports, and then folded over. A cage of the next module is then seated against the flanges 126, as shown in FIG. 3, and is fastened to the first cage at connections 130 shown schematically in FIGS. 12 and 12a. The above procedure is then repeated for the next module. Peripheral slots 132 in the bladder assembly flanges 126, FIGS. 7a and 8a, align with and accommodate the connections 130 of the successive cages.

Once the plurality of cell modules are preassembled in the configuration shown in FIG. 3, and filled with electrolyte, three elongated activation links 140, FIG. 7a, are positioned around the circumference of the cell modules. The activation links 140 extend axially with respect to each cell stack, as shown in FIGS. 2 and 3, and are positioned circumferentially about 120° apart, as shown in FIG. 7a. The three activation links extend axially essentially the full length of the battery, through all of the cell modules 12. Each activation link 140 is slotted longitudinally with a plurality of slots, one slot for each cell stack. The valve plates 70 have peripheral keys 142 (FIG. 7a) which fit within the activation link slots. Thus, the activation links 140 engage each valve plate 70 at three locations, 120° apart. When the battery is assembled, a plurality of the modules are stacked together as shown in FIG. 1. Clamps holding the modules 18 in an inactive mode are removed, but the modules 18 are now held in that mode by the activation links 140.

An activation module 144, FIGS. 13, 13a, 14, and 14a is provided at the end of the battery. The activation module 144 consists of two squibs 146 and a linkage 148, terminating at three pull pins 150, mounted on a base plate 152. The pull pins 150 engage the activation links 140. The activation module 144 is mounted to the end of the last cell module. Upon activation, the two squibs 146, mounted symmetrically about a rotating link 154, are fired in parallel, pushing on the rotating link 154 and causing it to turn. The linkage 148 is pulled in, causing the pull pins 150, engaging the three activation links 140, to be removed (FIGS. 14 and 14a). Once the restraining force of the activation links 140 is removed, the modules are free to expand and start up.

During assembly of the battery, once the activation links 140 are engaged with a valve plate of each cell module, and the restraining clamps are removed, the multiple cell modules can then be placed in a cell housing 160, FIG. 1. By way of example, the battery can comprise eight cell modules.

Figure 3A:
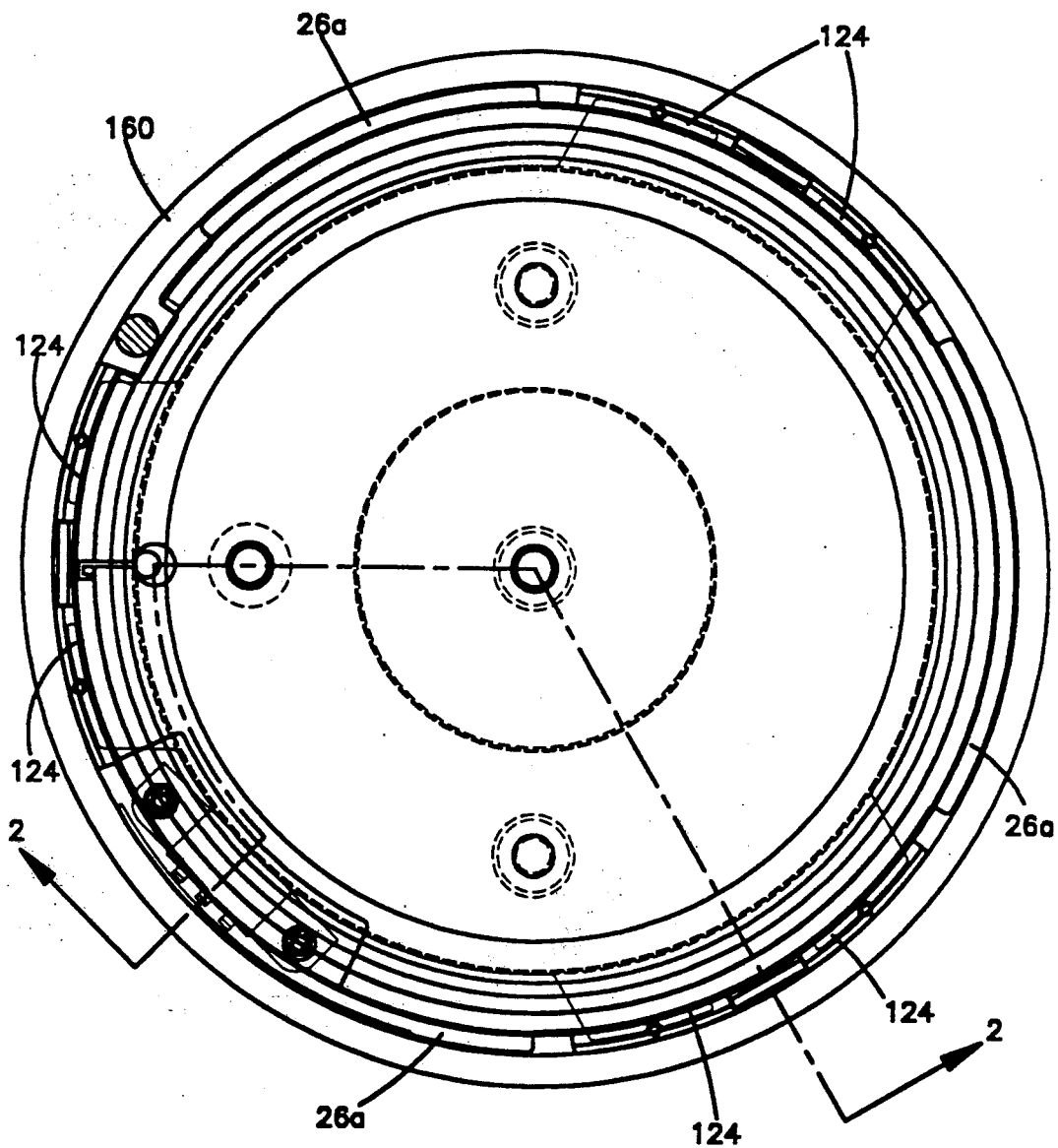
FIG. 3a is an end view of the cell module of FIGS. 2 and 3.

Above, reference was made to fins 26a (FIG. 4) on each of the anode plates 26. These fins 26a can be seen in the end view of FIG. 3a and are positioned at annular spaced apart locations between the cage fingers 124. FIG. 3a shows the external housing 160. The housing 160 can be any member adapted to contain the battery of the present invention. The housing contains a heat conducting medium, such as a silicone fluid, in which the battery is bathed The interelectrode electrolyte chambers 28 are separated from the housing medium by the bellows seals 22 (FIG. 2). The fins 26a extend past the bellows seals into the space occupied by the housing heat conducting medium. Following activation, the cells generate heat on discharge This heat is dissipated into the housing heat conducting medium by the plate fins 26a.

A test was conducted using a cell module 12 similar to that shown in FIGS. 2 and 3. The cell anode plates 26 were heated with a heat input equivalent to that resulting from operation of the cell at 5 kw. Thermocouples were connected to the cell anode plates 26 and fins 26a at a plurality of points. One thermocouple centered in the module 12 recorded an initial temperature increase to about 185° F. during about the first twelve minutes of the test, followed by only a slight temperature increase to about 195° F. for about the next sixteen minutes of the test. The temperature throughout the test remained at or below predicted temperature for the module 12. The test demonstrated that the above method of cooling the cell module was effective.

Once activated, current which is generated in a cell module flows from one bipolar anode/cathode plate 18 through the electrolyte in electrolyte chamber 28 to a next bipolar anode/cathode plate. The current generated in the cell module is collected at the endmost anode plate 72a (FIG. 10) which is part of the valve assembly 52. The endmost anode plate 72a has a copper ring 164, which is shown in FIG. 10, brazed or otherwise affixed to the reservoir assembly side of the anode plate, around the periphery of the anode plate. A similar ring 166 (FIG. 10) is brazed or otherwise affixed to the first anode plate 26' of the next cell stack 14'. A flexible cable (not shown) is brazed or otherwise attached at its ends to the two rings. The current collected at an endmost anode plate 72a is thus transmitted from cell module to cell module via the flexible cables. The endmost anode/cathode plates in the battery are connected to terminals affixed to the housing, as shown at 170, 172 in FIG. 1.

Advantages of the present invention should be apparent The battery 10 is capable of long term storage, particularly under a wide range of temperature conditions. It is capable of activation on demand. On activation, it provides a rapid start-up, and a large power output per unit weight and per unit volume. The battery also has a high gravimetric energy output (watt hours per gram). As indicated, eight cell modules, stacked in series, each module comprising twelve cells, can provide a power output of, for instance, 5,000 watts.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, we claim:

1. An activatable compact reserve battery comprising:
   a cell cage;
   an expandable cell stack contained within a first portion of said cage;
   an electrolyte reservoir assembly contained within a second portion of said cage;
   said cell stack being expandable into said cage second portion, expansion of said cell stack displacing electrolyte from said electrolyte reservoir to the cell stack thereby activating said battery.

2. The battery of claim 1 wherein said cell stack has a compressed mode and an expanded mode, including means for holding said cell stack in its compressed mode, and for mechanically releasing said cell stack to its expanded mode.

3. The battery of claim 2 wherein said cell stack comprises a plurality of bipolar anode/cathode plates in an aligned relationship, further including spring means between said plates biasing said cell stack to its expanded mode, said stack when in its expanded mode defining a plurality of electrolyte chambers intermediate said plates.

4. The battery of claim 3 including seal means between said anode/cathode plates circumferentially sealing said electrolyte chambers, said seal means being expandable with expansion of said cell stack.

5. The battery of claim 4 wherein said seal means and anode/cathode plates define an expandable bellows.

6. The battery of claim 4 wherein said anode/cathode plates comprise a heat dissipating fin means extending externally of said seal means.

7. The battery of claim 3 wherein said spring means comprises spring washers between successive anode/cathode plates, said spring washers comprising a dielectric means to prevent the flow of current through said spring means.

8. The battery of claim 3 wherein said anode/cathode plates comprise an anode of one or more of metal, metal alloy or intermetallic mixture, with a cathode comprising a reticulate structure filled with at least one metal oxide, which reticulate structure is bonded to a side of said anode.

9. The battery of claim 8 wherein said anodes comprise plates of aluminum, zinc, cadmium, iron, beryllium, magnesium or lithium, said cathodes are filled with silver oxide, nickel oxide or mixtures thereof and said cathodes are bonded to said anodes by an electrically conductive epoxy glue.

10. The battery of claim 1 wherein said reservoir assembly comprises a compressible bladder means.

11. The battery of claim 1 wherein said electrolyte comprises plural electrolyte components, said reservoir assembly comprising means for holding electrolyte components separately and mixing the same immediately prior to activation.

12. The battery of claim 11 wherein said reservoir assembly comprises a plurality of compressible bladders means.

13. The battery of claim 12 wherein said reservoir assembly comprises two bladders, one of said bladders being donut-shaped, and the other of said bladders being an inner bladder positioned axially within said donut-shaped bladder.

14. The battery of claim 13 further comprising a valve assembly comprising a valve plate and a mixing plate, said donut-shaped bladder and inner bladder being affixed to said valve plate, said valve plate and bladders having aligned communicating openings, said mixing plate being normally pressed against said valve plate, when the cell stack is in a compressed mode, to seal the openings in said valve plate.

15. The battery of claim 14 including a balancing bladder positioned between the mixing plate and valve plate, including opening means communicating said balancing bladder with said donut-shaped bladder, electrolyte flowing from the donut-shaped bladder to the balancing bladder on expansion of the cell stack to assist in separation of the valve plate and mixing plate.

16. The battery of claim 1 wherein each cage, cell stack and electrolyte reservoir defines a cell module, comprising a plurality of cell modules in stacked relationship connected electrically in series.

17. A compact reserve battery comprising:
a cell housing;
an expandable cell stack contained within said housing, said cell stack having a compressed mode and an expanded mode and when in said compressed mode occupying a first portion of said housing;
an electrolyte reservoir occupying a second portion of said housing;
passageway means communicating said electrolyte reservoir with said cell stack;
said cell stack when expanded from said compressed mode to said expanded mode occupying at least a part of said second portion displacing electrolyte from said electrolyte reservoir through said passageway means to said cell stack thereby activating said cell stack.

18. A compact mechanically activated reserve battery comprising:
a cell housing;
a cell module contained within said housing, said cell module comprising a cell stack and an electrolyte reservoir in end-to-end relationship with said cell stack;
said cell stack having a compressed mode and an expanded mode and comprising a plurality of aligned bipolar anode/cathode plates defining electrolyte chambers intermediate said plates, expandable seal means for sealing said electrolyte chambers, compressible spring means intermediate said plates for expanding said cell stack from its compressed mode to its expanded mode, and holding means for holding said stack in said compressed mode against the force of said spring means, said cell stack in said compressed mode occupying a first portion of said cell housing;
said electrolyte reservoir comprising a compressible bladder, a cell electrolyte contained within said compressible bladder, said electrolyte reservoir occupying a second portion of said cell housing;
passageway means communicating said electrolyte reservoir with said cell stack; and
means for releasing said holding means whereby said cell stack is expanded from said compressed mode to said expanded mode thereby occupying at least a portion of said second portion displacing electrolyte from said electrolyte reservoir to said cell stack thereby activating said cell stack.

19. A method for activating a reserve battery comprising:
positioning an expandable cell stack within a first portion of a cell housing and an electrolyte reservoir within a second portion of a cell housing;
providing a fluid communication means between said cell stack and said electrolyte reservoir;
causing said cell stack to expand into said second portion thereby displacing electrolyte from said electrolyte reservoir to said cell stack.

20. The method of claim 19 wherein said cell stack has an expanded mode and a compressed mode including the step of mechanically releasing said cell stack from its compressed mode to said expanded mode.

21. The method of claim 20 wherein said battery is a bipolar battery comprising bipolar anode/cathode plates, said plates when in an expanded mode defining electrolyte chambers between said plates, said electrolyte flowing from the electrolyte reservoir into said electrolyte chambers.

22. The method of claim 21 plural wherein said reservoir contains plural electrolytes therein and means for holding said electrolytes apart in said reservoir, said electrolytes mixing when displaced from said reservoir, said electrolytes when mixed generating heat for warming said battery on start-up.

23. The method of claim 22 wherein one of said electrolytes is one or more alkali metal hydroxide and the other of said electrolytes is one or more inorganic acid.

24. The method of claim 21 wherein said anode/cathode plates comprise a plurality of fins on the anode/cathode plates external of the electrolyte chambers, including the step of cooling said battery by dissipating heat through said fins.

25. A mechanically activated reserve battery comprising:
a plurality of bipolar anode/cathode plates defining electrolyte chambers between said plates;
said battery having a compressed mode in which said plates are contiguous with each other and an expanded, activated mode;
a metallic wave spring intermediate and in contact with at least one pair of bipolar anode/cathode plates biasing said battery to its expanded, activated mode, said wave spring having a dielectric coating.

26. A mechanically activated reserve battery comprising:
a plurality of aligned bipolar anode/cathode plates;
said battery having a compressed mode in which said plates are contiguous with each other and an expanded, activated mode in which said plates are spaced apart;
an annular bellows-shaped seal between adjacent anode/cathode plates defining with said plates at least one electrolyte chamber intermediate said plates;
said seal comprising an annular rib affixed to the periphery of one of said anode/cathode plates and an annular rib affixed to the periphery of an anode/cathode plate adjacent said one anode/cathode plate.

27. A mechanically activated reserve battery comprising:
a plurality of bipolar anode/cathode plates defining electrolyte chambers between said plates;
said battery having a compressed inactive mode in which said plates are contiguous with each other and an expanded, activated mode in which said plates are spaced apart;
spring means intermediate said anode/cathode plates biasing said anode/cathode plates to an expanded mode;
an electrolyte reservoir;
means for pressurizing the electrolyte in said reservoir with movement of said anode/cathode plate to an expanded mode;
a valve between said electrolyte reservoir and said electrolyte chambers, said valve comprising valve components in a closed, contiguous relationship when said battery is in an inactive mode and in an open spaced-apart relationship when said battery is in an activated mode, said valve comprising a bladder intermediate said components adapted to receive electrolyte under pressure and to move said components to said open spaced-apart relationship when said battery is activated.

28. The battery of claim 27 including spring means between said valve components biasing said components to an open spaced-apart relationship.

29. A mechanically activated reserve battery for marine use comprising:
a plurality of bipolar anode/cathode plates;
said battery having a compressed mode in which said plates are contiguous with each other and an expanded mode in which said plates are spaced apart;
a housing for said battery; anode/cathode plates defining with said plates at least one electrolyte chamber intermediate said plates;
said housing defining an outer chamber separated from said electrolyte chamber by said elastomeric seal;
said outer chamber containing an incompressible fluid.

30. The battery of claim 29 wherein said incompressible fluid is silicone oil.

31. The battery of claim 29 wherein said anode/cathode plates comprise fins extending into said outer chamber to dissipate heat generated in said electrolyte chamber.

32. The battery of claim 25, wherein said electrolyte chambers contain a plurality of components adapted to be mixed and when mixed generate heat for warming the battery.

33. The battery of claim 32 wherein one of said components is a base and another of said components is a acid, mixing of said components providing heat of neutralization and heat of dilution.

34. The battery of claim 33 wherein said base is potassium hydroxide and said acid is sulfuric acid.

35. The battery of claim 33 wherein the relative concentrations and amounts of the acid and base provide a base concentration, when mixed, in the range of about 6 to 10 M.

36. The battery of claim 35 wherein the relative concentrations and amounts of the acid and base provide a base concentration, when mixed, in the range of about 7 to 8 M.

37. The battery of claim 36 wherein said base is 12 M potassium hydroxide and said acid is 4 M sulfuric acid.

38. The battery of claim 32 wherein one of said components is a base and another of said components is a component non-reactive with the base selected from the group consisting of water, alcohol and a salt, said heat which is generated being heat of dilution.

39. The battery of claim 32 wherein one of said components is a caustic solution containing an antifoaming agent.

40. The battery of claim 39 wherein said antifoaming agent is a surfactant.

* * * * *

UNITED STATES PATENT AND TRADEMARK OFFICE
CERTIFICATE OF CORRECTION

PATENT NO. : 5,196,276
DATED : March 23, 1993
INVENTOR(S) : Marilyn J. Niksa, Kenneth J. Gregg, Jay M. Noscal and Roger J. Chmura It is certified that error appears in the above-indentified patent and that said Letters Patent is hereby corrected as shown below:

Column 16, line 4, after "claim 21" cancel "plural".

Column 17, line 12, after "said battery" cancel "anode/cathode plates de-";
line 13, at the beginning of the line cancel "fining";
line 13, before "with said plates" insert --an annular elastomeric seal between adjacent anode/cathode plates defining--".

Signed and Sealed this

Seventh Day of December, 1993

*Attest:*

BRUCE LEHMAN

*Attesting Officer*     *Commissioner of Patents and Trademarks*